(12) United States Patent
Mikoshiba

(10) Patent No.: US 12,258,712 B2
(45) Date of Patent: Mar. 25, 2025

(54) SHEET MANUFACTURING SYSTEM

(71) Applicant: SEIKO EPSON CORPORATION, Tokyo (JP)

(72) Inventor: Takao Mikoshiba, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 209 days.

(21) Appl. No.: 18/188,506

(22) Filed: Mar. 23, 2023

(65) Prior Publication Data

US 2023/0304223 A1    Sep. 28, 2023

(30) Foreign Application Priority Data

Mar. 25, 2022    (JP) .............................. JP2022-049473

(51) Int. Cl.
    *D21G 9/00*          (2006.01)
    *D21B 1/08*          (2006.01)
    *D21H 11/14*       (2006.01)

(52) U.S. Cl.
    CPC ............. *D21G 9/0018* (2013.01); *D21B 1/08* (2013.01); *D21H 11/14* (2013.01); *Y02W 30/64* (2015.05)

(58) Field of Classification Search
    CPC .......... D21G 9/0018; D21G 9/00; D21F 9/00; D21B 1/08; D21B 1/32; D21B 1/061;
(Continued)

(56) References Cited

U.S. PATENT DOCUMENTS 4,098,464 A   *   7/1978   Niedner ..................... B03B 9/06
                                                      241/24.22
6,136,590 A   *   10/2000   Kruse ....................... C05F 9/02
                                                      241/DIG. 38

(Continued)

FOREIGN PATENT DOCUMENTS

CN        106453489 A   *   2/2017
CN        118719768 A   *   10/2024
(Continued)

*Primary Examiner* — Carlos N Lopez
(74) *Attorney, Agent, or Firm* — Global IP Counselors, LLP

(57) ABSTRACT

A sheet manufacturing system includes a coarsely crushing apparatus that coarsely crushes a paper; a sheet manufacturing apparatus that generates a sheet-shaped recycled paper using coarsely crushed pieces of the paper as a raw material; and a server that is connected to the coarsely crushing apparatus and the sheet manufacturing apparatus via a network, in which the sheet manufacturing apparatus has a reserving section that reserves the coarsely crushed pieces, a remaining amount detector that detects a remaining amount of the coarsely crushed pieces in the reserving section, a calculation section that calculates an allowable filling amount of the coarsely crushed pieces in the reserving section based on a detection result of the remaining amount detector, and an output section that transmits information related to the calculated allowable filling amount to the server, and the coarsely crushing apparatus has an integration section that integrates the coarsely crushed pieces, an input section that acquires the information related to the allowable filling amount from the server, a display information generation section that generates display information related to the allowable filling amount based on the information acquired by the input section, and a display section that displays the display information.

7 Claims, 8 Drawing Sheets

(58) Field of Classification Search
CPC .......... D21B 1/068; D21H 11/14; D21C 5/02; Y02W 30/64
See application file for complete search history.

(56) References Cited

U.S. PATENT DOCUMENTS

| | | | |
|---|---|---|---|
| 7,815,741 B2* | 10/2010 | Olson | C13K 1/02 |
| | | | 127/23 |
| 10,350,784 B2* | 7/2019 | Murayama | D21F 9/00 |
| 2016/0221214 A1* | 8/2016 | Monbetsu | B27N 3/04 |
| 2019/0240607 A1* | 8/2019 | Yamada | B01D 46/71 |
| 2020/0165092 A1* | 5/2020 | Mikoshiba | D21F 7/006 |
| 2023/0073306 A1* | 3/2023 | Koike | A01G 13/0268 |
| 2023/0304223 A1* | 9/2023 | Mikoshiba | D21G 9/0018 |
| 2024/0102240 A1* | 3/2024 | Sakurada | D21F 9/00 |
| 2024/0167223 A1* | 5/2024 | Horiko | D21B 1/347 |

FOREIGN PATENT DOCUMENTS

| | | | | |
|---|---|---|---|---|
| DE | 202019106364 U1 * | 1/2020 | | D21C 5/00 |
| JP | 2003340823 A * | 12/2003 | | |
| JP | 2006104633 A * | 4/2006 | | |
| JP | 2010180512 A * | 8/2010 | | D21B 1/32 |
| JP | 2016137608 A * | 8/2016 | | |
| JP | 2019173196 A * | 10/2019 | | D21B 1/10 |
| JP | 2021178703 A * | 11/2021 | | B01F 27/90 |
| JP | 2023132517 A * | 9/2023 | | |
| WO | WO-03107103 A1 * | 12/2003 | | D21G 9/0018 |
| WO | WO-2015128912 A1 * | 9/2015 | | B27N 1/00 |
| WO | WO-2016035313 A1 * | 3/2016 | | B65H 1/14 |
| WO | WO-2018180067 A1 * | 10/2018 | | B27N 3/04 |

* cited by examiner

SHEET MANUFACTURING SYSTEM

The present application is based on, and claims priority from JP Application Serial Number 2022-049473, filed Mar. 25, 2022, the disclosure of which is hereby incorporated by reference herein in its entirety.

BACKGROUND

1. Technical Field

The present disclosure relates to a sheet manufacturing system.

2. Related Art

A dry-type sheet manufacturing apparatus is known which obtains sheet-shaped recycled paper by coarsely crushing waste paper, such as used copy paper, into strips to make coarsely crushed pieces, defibrating the coarsely crushed pieces, accumulating the defibrated materials on a flat surface, heating the accumulated materials, and applying pressure. It is preferable that the sheet manufacturing apparatus contributes to reducing the burdens on the global environment.

For example, JP-A-2006-104633 discloses a sheet manufacturing apparatus including a coarsely crushing section that coarsely crushes waste paper, a reserving section that reserves coarsely crushed pieces obtained by the coarsely crushing section, a defibrating section that defibrates the coarsely crushed pieces reserved in the reserving section, an accumulation section that accumulates the defibrated material obtained by the defibrating section on a flat surface, a heating and pressurizing section that heats and pressurizes accumulated web, a cutting section that cuts a sheet obtained by the heating and pressurizing section into a predetermined shape, and a sheet collection section that collects the obtained sheet.

The sheet manufacturing apparatus is installed in, for example, one room in an office as one device in which each section from the coarsely crushing section to the sheet collection section is housed in one housing. In this case, a process from supplying a raw material to collecting a manufactured sheet is completed at the same spot, that is, in a room where the sheet manufacturing apparatus is installed.

On the other hand, it is considered that a coarsely crushing apparatus, such as a shredder, is installed in a second room separated from a first room in which the sheet manufacturing apparatus is installed, a worker collects coarsely crushed pieces integrated in an integration section of the coarsely crushing apparatus, the coarsely crushed pieces are transported to the first room, and the coarsely crushed pieces are replenished in a reserving section of the sheet manufacturing apparatus. According to this method, since raw materials outside the installation spot of the sheet manufacturing apparatus are also supplied to manufacture the sheet, it is possible to reduce the risk of the suspension of the operation of the sheet manufacturing apparatus due to insufficient supply of raw materials, so that there is an advantage in that the sheet can be efficiently manufactured.

However, as above, when the sheet manufacturing apparatus and the coarsely crushing apparatus are respectively installed in separated locations, for example, separate rooms, on the side of the coarsely crushing apparatus, it is not possible to obtain information related to the side of the sheet manufacturing apparatus, particularly, information related to the remaining amount of the coarsely crushed pieces in the reserving section of the sheet manufacturing apparatus or information related to the allowable filling amount of the reserving section derived from the remaining amount. Therefore, there is a problem that it is not possible to easily and appropriately determine the transport of the coarsely crushed pieces from the coarsely crushing apparatus to the sheet manufacturing apparatus.

SUMMARY

According to an aspect of the present disclosure, there is provided a sheet manufacturing system including a coarsely crushing apparatus that coarsely crushes a paper, a sheet manufacturing apparatus that generates a sheet-shaped recycled paper using coarsely crushed pieces of the paper as a raw material, and a server that is connected to the coarsely crushing apparatus and the sheet manufacturing apparatus via a network, in which the sheet manufacturing apparatus has a reserving section that reserves the coarsely crushed pieces, a remaining amount detector that detects a remaining amount of the coarsely crushed pieces in the reserving section, a calculation section that calculates an allowable filling amount of the coarsely crushed pieces in the reserving section based on a detection result of the remaining amount detector, and an output section that transmits information related to the calculated allowable filling amount to the server, and the coarsely crushing apparatus has an integration section that integrates the coarsely crushed pieces, an input section that acquires the information related to the allowable filling amount from the server, a display information generation section that generates display information related to the allowable filling amount based on the information acquired by the input section, and a display section that displays the display information.

According to another aspect of the present disclosure, there is provided a sheet manufacturing system including a coarsely crushing apparatus that coarsely crushes a paper, a first sheet manufacturing apparatus that generates a sheet-shaped recycled paper using coarsely crushed pieces of the paper as a raw material, a second sheet manufacturing apparatus that generates a sheet-shaped recycled paper using coarsely crushed pieces of the paper as a raw material, and a server that is connected to the coarsely crushing apparatus, the first sheet manufacturing apparatus, and the second sheet manufacturing apparatus via a network, in which the first sheet manufacturing apparatus has a first reserving section that reserves the coarsely crushed pieces, a first remaining amount detector that detects a remaining amount of the coarsely crushed pieces in the first reserving section, a first calculation section that calculates a first allowable filling amount of the coarsely crushed pieces in the first reserving section based on a detection result of the first remaining amount detector, and a first output section that transmits information related to the calculated first allowable filling amount to the server, the second sheet manufacturing apparatus has a second reserving section that reserves the coarsely crushed pieces, a second remaining amount detector that detects a remaining amount of the coarsely crushed pieces in the second reserving section, a second calculation section that calculates a second allowable filling amount of the coarsely crushed pieces in the second reserving section based on a detection result of the second remaining amount detector, and a second output section that transmits information related to the calculated second allowable filling amount to the server, and the coarsely crushing apparatus has an integration section that integrates the coarsely crushed pieces, an input section that acquires the information related to the first allowable filling amount and the second allowable filling amount from the server, a display information generation section that generates display information related to the first allowable filling amount and the second allowable filling amount based on the information acquired by the input section, and a display section that displays the display information.

DESCRIPTION OF EXEMPLARY EMBODIMENTS

Hereinafter, a sheet manufacturing system of the present disclosure will be described in detail based on a preferred embodiment shown in the accompanying drawings.

First Embodiment

Figure 1:
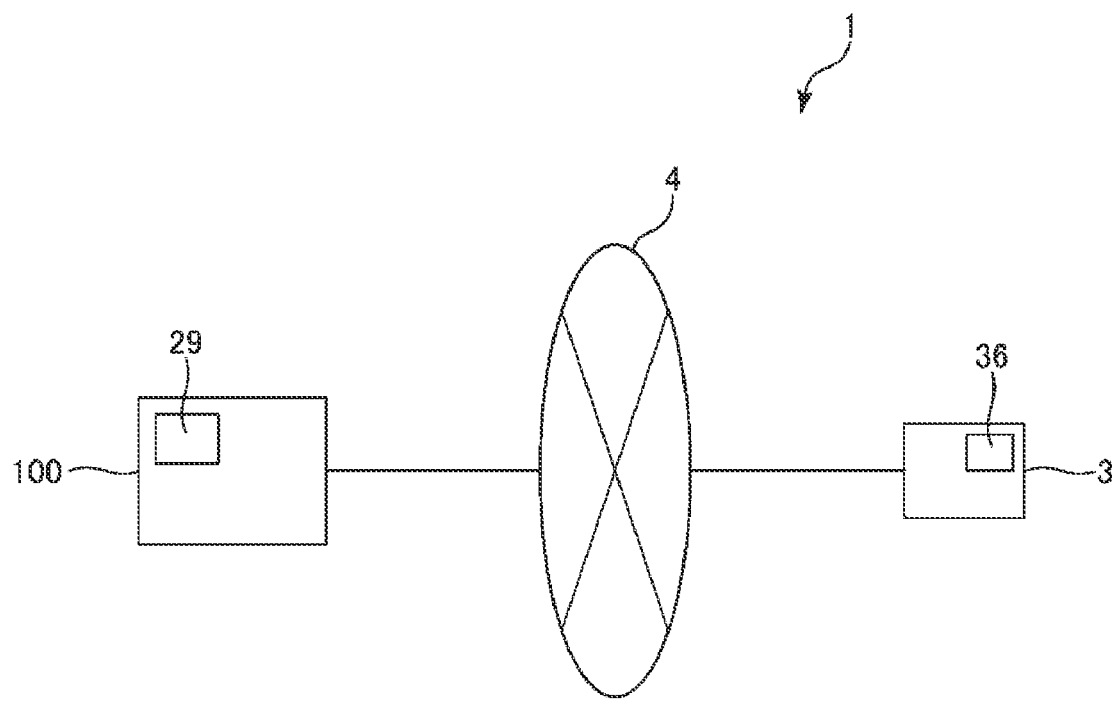
FIG. 1 is a schematic configuration diagram of a sheet manufacturing system according to a first embodiment.
Figure 2:
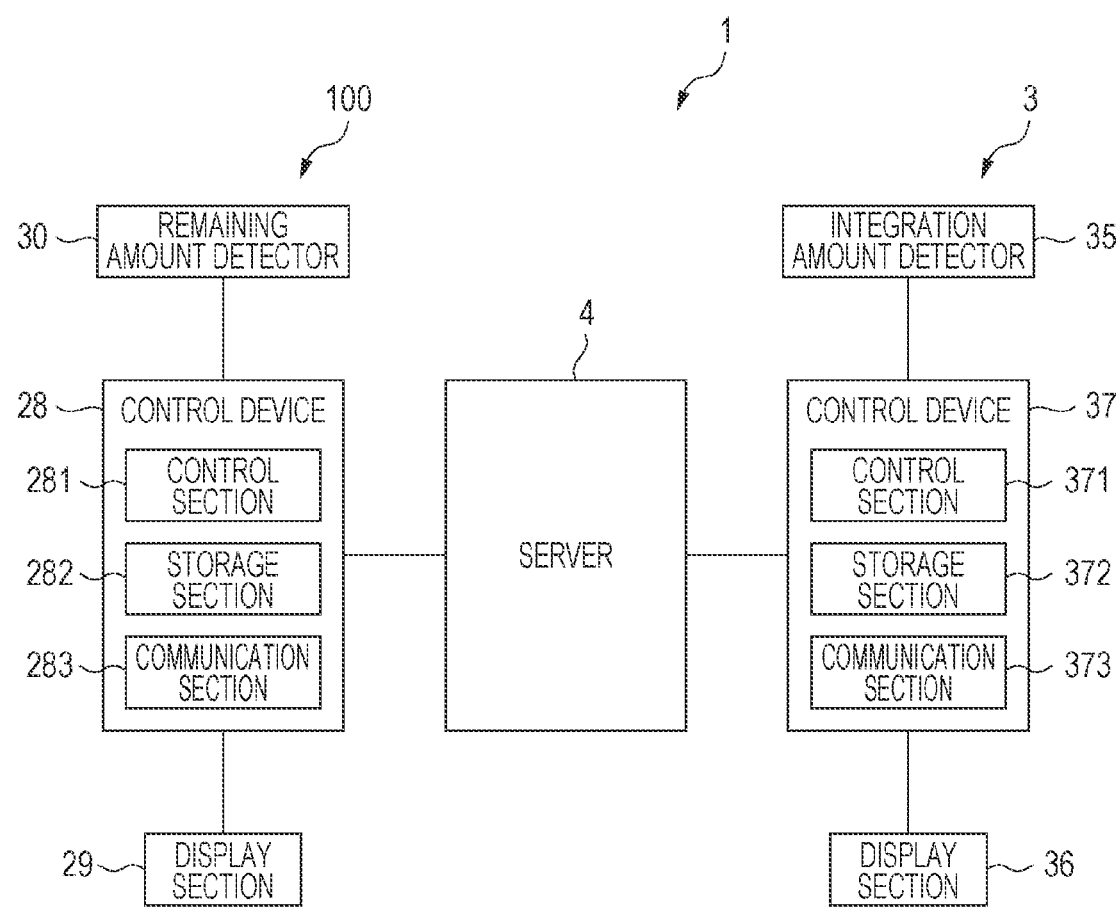
FIG. 2 is a block diagram of the sheet manufacturing system shown in FIG. 1.
Figure 3:
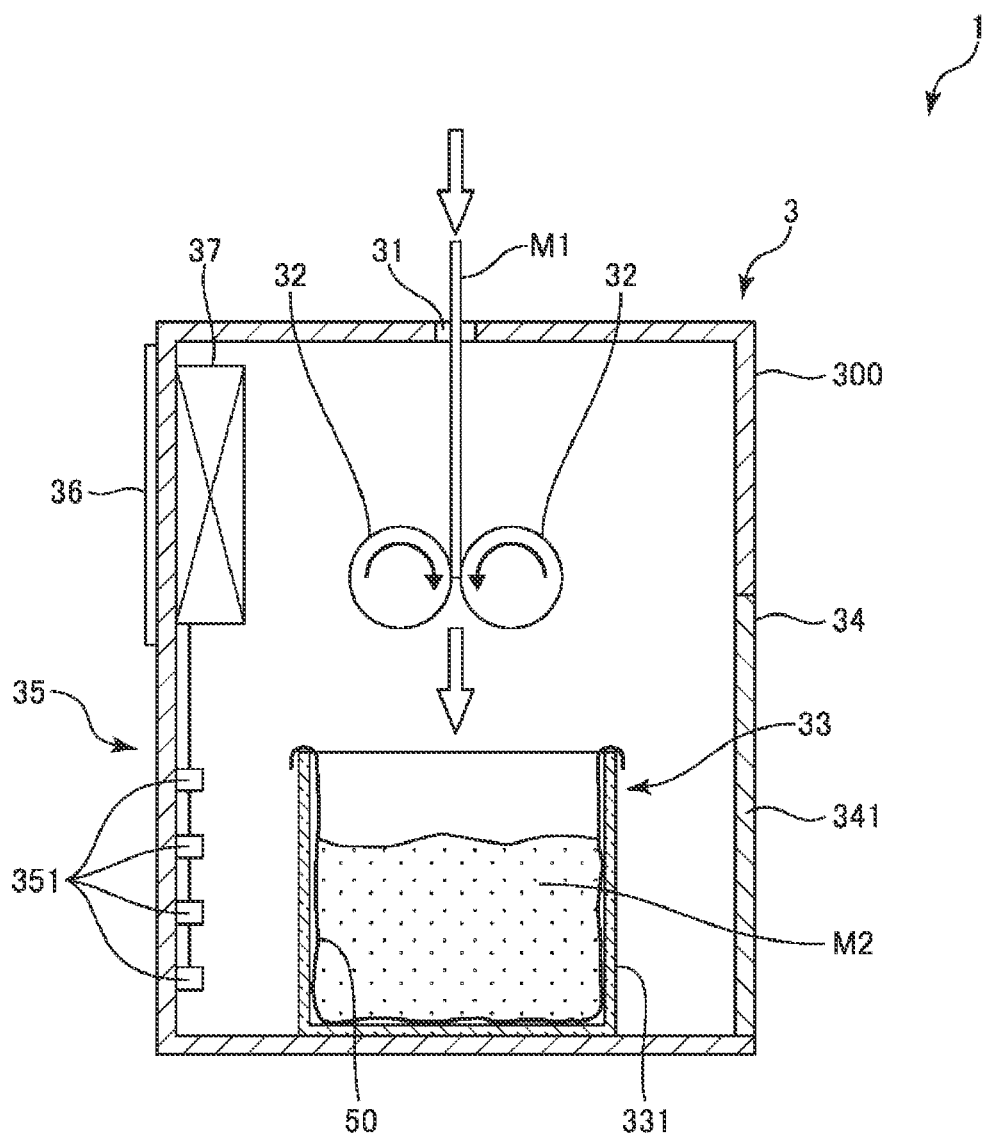
FIG. 3 is a cross-sectional diagram of a coarsely crushing apparatus shown in FIG. 1.
Figure 4:
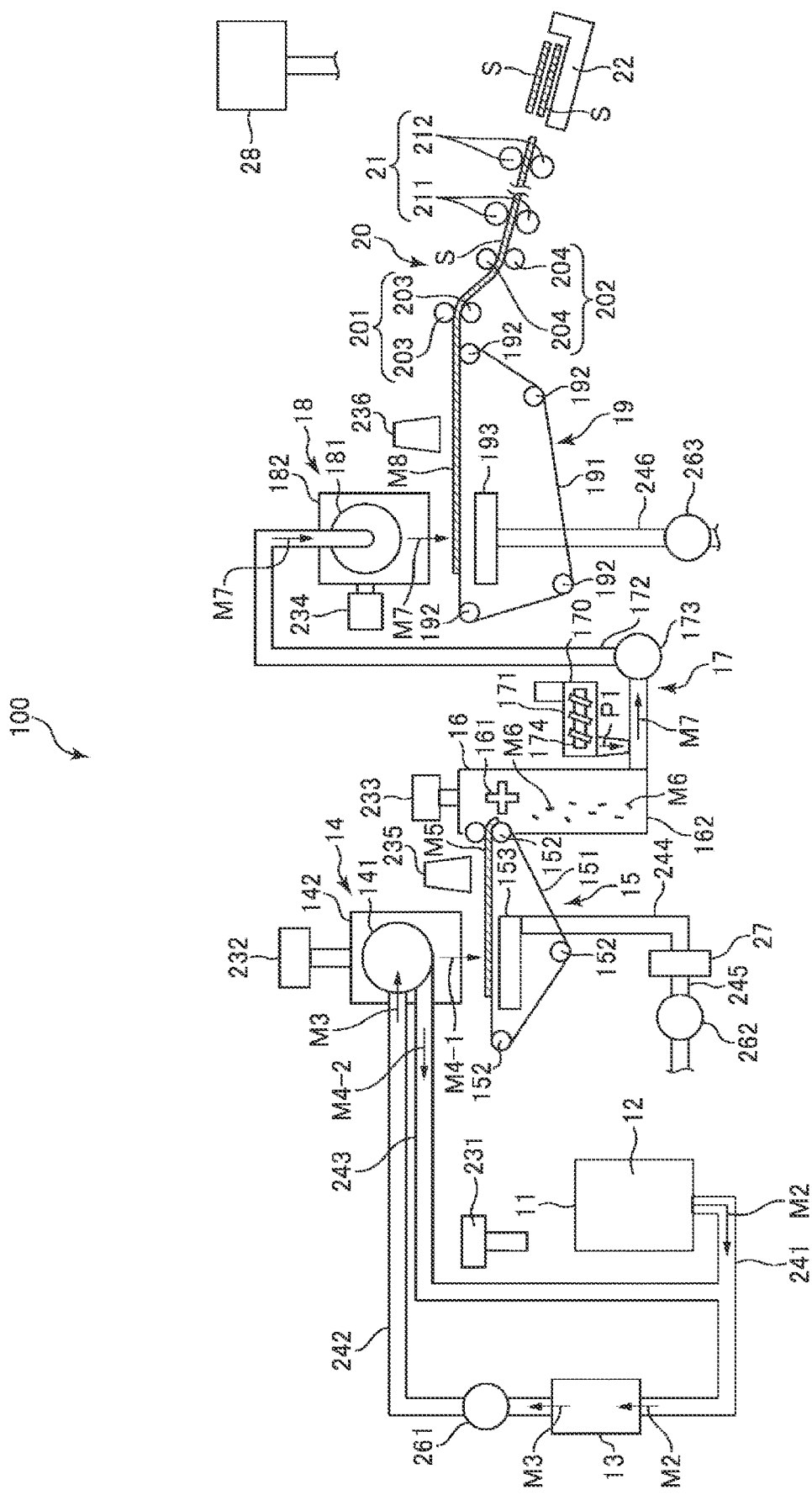
FIG. 4 is a schematic configuration diagram of a sheet manufacturing apparatus shown in FIG. 1.
Figure 5:
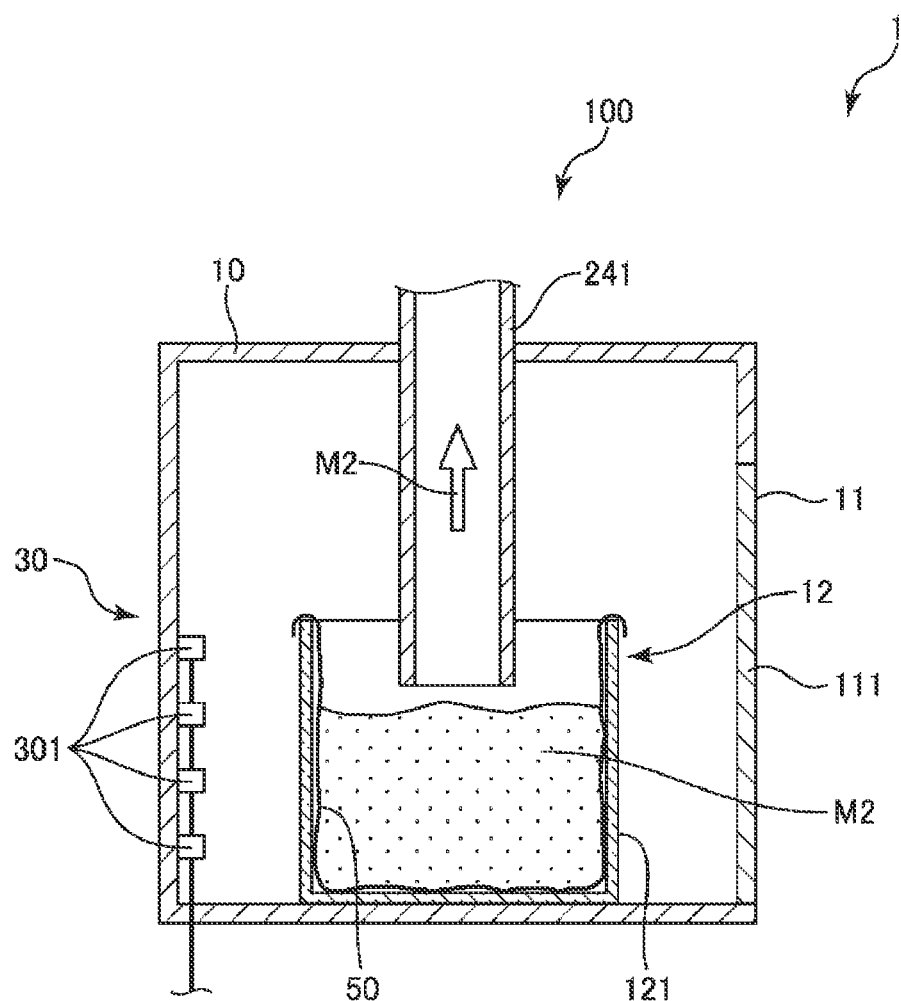
FIG. 5 is a cross-sectional diagram of a reserving section included in the sheet manufacturing apparatus shown in FIG. 1.
Figure 6:
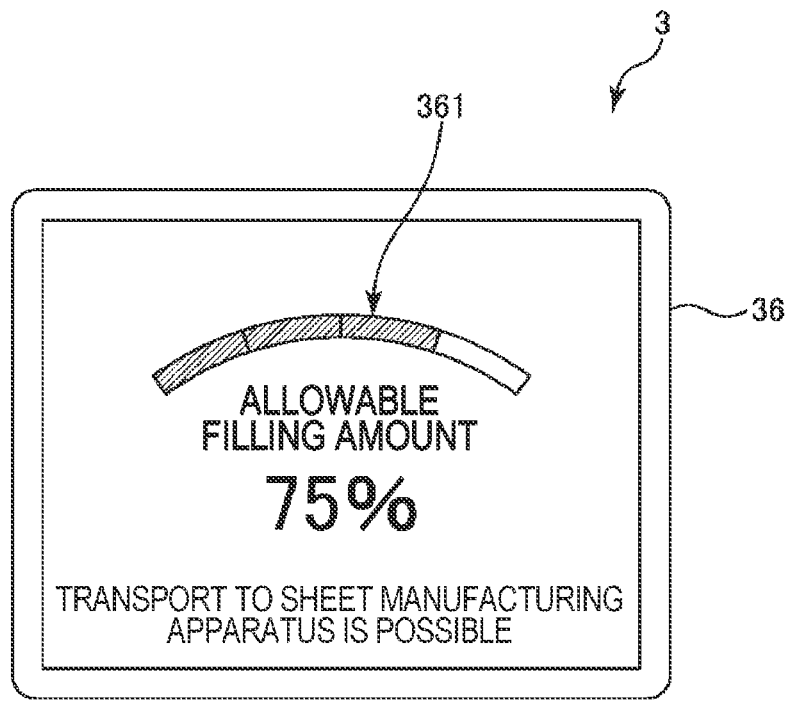
FIG. 6 is a diagram showing display information of a display section included in the coarsely crushing apparatus shown in FIG. 1.
Figure 7:
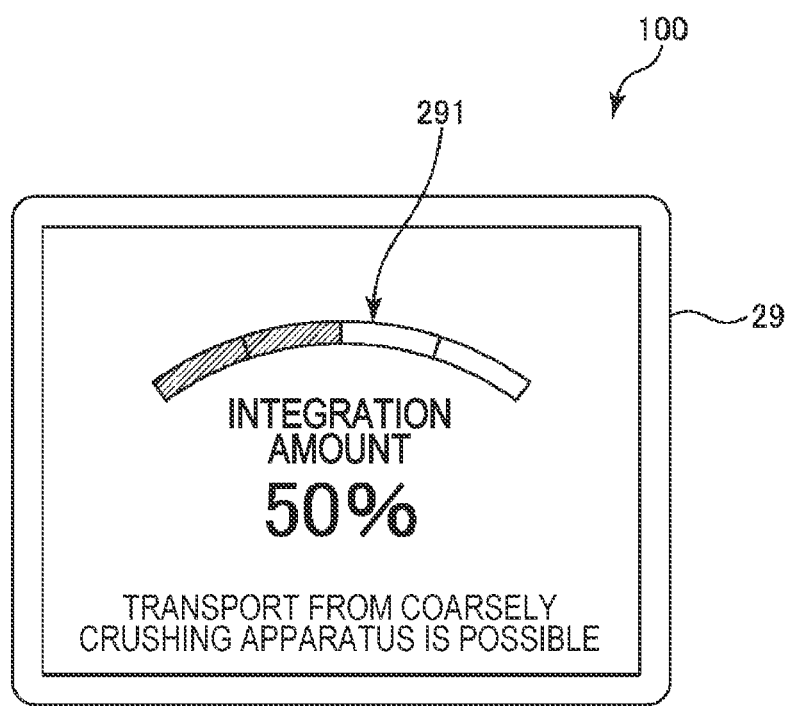
FIG. 7 is a diagram showing the display information of a display section included in the sheet manufacturing apparatus shown in FIG. 1.

FIG. 1 is a schematic configuration diagram of a sheet manufacturing system according to a first embodiment. FIG. 2 is a block diagram of the sheet manufacturing system shown in FIG. 1. FIG. 3 is a cross-sectional diagram of a coarsely crushing apparatus shown in FIG. 1. FIG. 4 is a schematic configuration diagram of a sheet manufacturing apparatus shown in FIG. 1. FIG. 5 is a cross-sectional diagram of a reserving section included in the sheet manufacturing apparatus shown in FIG. 1. FIG. 6 is a diagram showing display information of a display section included in the coarsely crushing apparatus shown in FIG. 1. FIG. 7 is a diagram showing the display information of a display section included in the sheet manufacturing apparatus shown in FIG. 1.

Hereinafter, in FIGS. 3 to 5, an upper side may be referred to as "upper" or "upward", and a lower side may be referred to as "lower" or "downward". FIG. 4 is a schematic configuration diagram, and the positional relationship, orientation, size, and the like of each section of the sheet manufacturing apparatus 100 are not limited to those shown in the drawing. In addition, in each drawing, directions through which coarsely crushed pieces M2, a defibrated material M3, a first sorted material M4-1, a second sorted material M4-2, a first web M5, subdivided bodies M6, a mixture M7, a second web M8, and a recycled paper S are transported, that is, a direction indicated by arrows are also referred to as a transport direction. In addition, a tip end side of the arrow in FIG. 4 is also referred to as "downstream" in the transport direction, and a base end side of the arrow in FIG. 4 is also referred to as "upstream" in the transport direction.

The sheet manufacturing system 1 shown in FIGS. 1 to 3 includes a coarsely crushing apparatus 3 that coarsely crushes, for example, a paper M1 such as used copy paper, which is a raw material, a sheet manufacturing apparatus 100 that generates a sheet-shaped recycled paper S using the coarsely crushed pieces M2 of the paper M1 as the raw material, and a server 4 that is coupled to the coarsely crushing apparatus 3 and the sheet manufacturing apparatus 100 via a network. The coarsely crushing apparatus 3 coarsely crushes the paper M1 to generate the coarsely crushed pieces M2. The generated coarsely crushed pieces M2 are supplied to the sheet manufacturing apparatus 100. The sheet manufacturing apparatus 100 performs a process, which will be described later, on the coarsely crushed pieces M2 supplied from the coarsely crushing apparatus 3, and regenerates the recycled paper S.

The server 4 has a function of providing data or information in response to a request, which is received from the coarsely crushing apparatus 3 or the sheet manufacturing apparatus 100 via the network, via the network. Examples of the network include a wired or wireless LAN, a WAN, an intranet, the Internet, and the like.

The coarsely crushing apparatus 3 and the sheet manufacturing apparatus 100 are installed at distant locations, for example, on different floors in one building, or in different rooms on the same floor. Furthermore, the coarsely crushing apparatus 3 and the sheet manufacturing apparatus 100 may be installed at different spots in the same room. A user transports the coarsely crushed pieces M2 generated by the coarsely crushing apparatus 3 and integrated in an integration section 33 to the reserving section 12 of the sheet manufacturing apparatus 100 shown in FIG. 4 in a state of being contained in the container 50, and supplies the coarsely crushed pieces M2 to the sheet manufacturing apparatus 100. The container 50 may be any container as long as it can house the coarsely crushed pieces M2, and may be either soft or hard in form. Hereinafter, the container 50 will be described as a bag-shaped container which is soft, that is, flexible and deformable.

As shown in FIG. 3, the coarsely crushing apparatus 3 is a so-called shredder, and includes a housing 300, an insertion port 31 for inserting the paper M1, and a pair of coarsely crushing blades 32 for coarsely crushing the inserted paper M1, an integration section 33 for integrating the generated coarsely crushed pieces M2, a take-out port 34 for taking out the coarsely crushed pieces M2 in the integration section 33, an integration amount detector 35 for detecting the integration amount of the coarsely crushed pieces M2 in the integration section 33, a display section 36, and a control device 37. The insertion port 31 and the take-out port 34 are formed in the housing 300, the pair of coarsely crushing blades 32, the integration section 33, the integration amount detector 35, and the control device 37 are installed inside the housing 300, and the display section 36 is installed at a visually recognizable position outside the housing 300.

Examples of the paper M1 include a sheet-shaped material made of a fiber content containing a cellulose fiber. The cellulose fiber may be a fibrous material containing cellulose as a compound as a main component, and may contain hemicellulose and lignin in addition to the cellulose. In addition, the paper M1 may have any form such as used or unused copy paper, woven fabric, non-woven fabric, and the like. In addition, the paper M1 may be, for example, recycled paper regenerated and manufactured by defibrating waste paper, may be YUPO paper (registered trademark) of synthetic paper, or may not be the recycled paper.

The insertion port 31 is an opening formed by an elongated hole provided at the upper portion of the housing 300. Although not shown in the drawing, the insertion port 31 may be provided with rollers that take the paper M1 into the inside of the housing 300 and a guide member that guides the paper M1.

Each of the pair of coarsely crushing blades 32 has a columnar shape, and the blades are formed on the outer peripheral portion thereof. The pair of coarsely crushing blades 32 are provided in parallel and rotate in directions opposite to each other to coarsely crush, that is, cut the paper M1 therebetween. Each of the coarsely crushing blades 32 is coupled to a motor (not shown) via a driving force transmission mechanism (not shown), and the motor is electrically coupled to the control device 37 and whose energization condition is controlled by the control device 37, so that the rotation of the coarsely crushing blade 32 is controlled. The coarsely crushed pieces M2 are generated by the coarsely crushing blade 32. It is preferable that the shapes and sizes of the coarsely crushed pieces M2 are suitable for a defibrating process in a defibrating section 3 which will be described later. Examples of the shapes of the coarsely crushed pieces M2 include a small piece having a square shape in a planar shape and a small piece having a rectangular shape, particularly, a strip shape. It is preferable that the sizes of the coarsely crushed pieces M2 are, for example, small pieces having an average length of one side of 100 mm or less, and it is more preferable that the sizes are small pieces of 3 mm or more and 70 mm or less. The shape of the small piece may be other than the square shape or the rectangular shape. The shapes and sizes of the coarsely crushed pieces M2 can be set, for example, by selecting the blades of the coarsely crushing blades 32.

The integration section 33 has a loading section 331 into which the container 50 is loaded. The loading section 331 is a box-shaped or frame-shaped structure in which the container 50 can be detachably installed. When the container 50 is a hard container, the loading section 331 can be a mounting table on which the container 50 is mounted.

In the present embodiment, the container 50 can also be loaded into the reserving section 12 of the sheet manufacturing apparatus 100. That is, the container 50 is used as being compatible between the coarsely crushing apparatus 3 and the sheet manufacturing apparatus 100.

The take-out port 34 is an opening provided on the back surface of the housing 300, that is, on a wall portion on the right side in FIG. 3. In addition, the take-out port 34 is provided with a door 341 that can be opened and closed, so that, when the door 341 is in an opened state, the container 50 containing the coarsely crushed pieces M2 can be taken out or the empty container 50 can be installed in the integration section 33.

The integration amount detector 35 detects the integration amount of the coarsely crushed pieces M2 in the integration section 33 (hereinafter, also simply referred to as "integration amount"). When the container 50 is loaded into the integration section 33, the integration amount is the integration amount of the coarsely crushed pieces M2 in the container 50, and can be referred to as the volume of the coarsely crushed pieces M2. The integration amount detector 35 is configured by a level sensor that detects the volume of the integrated coarsely crushed pieces M2 as the uppermost position of the coarsely crushed pieces M2. The integration amount detector 35 has a plurality of optical sensors 351, that is, four in the configuration shown in the drawing. Each optical sensor 351 is disposed apart from each other along the depth direction, that is, the vertical direction of the container 50 installed in the loading section 331.

Each optical sensor 351 is a reflection type optical sensor and includes a light emitting section that emits laser light and a light reception section that receives the reflected light of the laser light from the coarsely crushed pieces M2. The loading section 331 and the container 50 are made of, for example, a substantially transparent material and have light transmittance. When the laser light emitted from the light emitting section is reflected by the coarsely crushed pieces M2 and reflected light is received, photoelectrical conversion is performed on the received light to output a signal, and the optical sensor 351 detects that the coarsely crushed pieces M2 are present at the installation height of the optical sensor 351. The integration amount detector 35 can detect the height, that is, the volume of the integrated coarsely crushed pieces M2 by combining the presence or absence of light reception of the reflected light from each optical sensor 351. For example, when all the optical sensors 351 do not receive the reflected light, the container 50 is determined to be empty, and, when all the optical sensors 351 receive the reflected light, the container 50 is determined to be fully integrated with the coarsely crushed pieces M2. By specifying the optical sensor 351, which receives or does not receive the reflected light, among the four optical sensors 351, the integration amount of the coarsely crushed pieces M2 in the integration section 33 (hereinafter, also simply referred to as "integration amount") can be detected.

The optical sensor 351 is not limited to a reflection type and a transmission type optical sensor can be used. In addition, a capacitance sensor can be used instead of the optical sensor.

As shown in FIGS. 2 and 3, each optical sensor 351 constituting the integration amount detector 35 is electrically coupled to the control device 37, and a signal output from each optical sensor 351 is input to the control device 37. In the control device 37, a predetermined process is performed on the input signal, and information related to the integration amount of the coarsely crushed pieces M2 in the integration section 33 can be obtained.

In addition, the integration amount may be a ratio of the amount of coarsely crushed pieces M2 which are currently integrated to the maximum amount of the coarsely crushed pieces M2 which can be filled in the integration section 33, particularly, a volume ratio or a weight ratio. The unit in this case can be (%).

The integration amount detector 35 is not limited to the configuration shown in the drawing, and may be configured by, for example, a weight sensor that measures the weight of the coarsely crushed pieces M2 in the container 50. Even in this case, the integration amount of the coarsely crushed pieces M2 in the integration section 33 can be detected.

As above, the coarsely crushing apparatus 3 has the integration amount detector 35 that detects the integration amount of the coarsely crushed pieces M2 in the integration section 33. As a result, the integration amount can be easily grasped. As a result, it is possible to more easily and appropriately determine the transport of the coarsely crushed pieces M2 from the coarsely crushing apparatus 3 to the sheet manufacturing apparatus 100.

Unlike the configuration shown in the drawing, the coarsely crushing apparatus 3 may have a configuration that does not have the integration amount detector 35. In this case, for example, the user can visually confirm the integration amount, and can determine the transport of the coarsely crushed pieces M2 to the sheet manufacturing apparatus 100 based on the confirmed integration amount.

The display section 36 included in the coarsely crushing apparatus 3 is a display provided on a surface on the front side of the housing 300, that is, on the left side in FIG. 3. Examples of the type of the display include a liquid crystal display, an organic EL display, and the like. The display section 36 is driven by the control device 37 to control the display content.

As shown in FIG. 2, the control device 37 includes a control section 371, a storage section 372, and a communication section 373.

The control section 371 has at least one processor and executes various programs stored in the storage section 372. As the processor, for example, a Central Processing Unit (CPU) can be used. In addition, the control section 371 has various functions, such as, a function of controlling the drive of the coarsely crushing blades 32, a function of controlling the operation of the display section 36, a function of acquiring information related to an allowable filling amount, which will be described later, from the server 4, a function of generating display information related to the allowable filling amount based on the information related to the allowable filling amount, a function of transmitting information related to the integration amount to the server 4, a function of determining whether or not the integration amount exceeds the allowable filling amount, a function of transmitting and receiving a device ID and a user ID which will be described later, and the like. That is, the control section 371 has a display information generation section that generates the display information to be displayed on the display section 36, particularly display information related to the allowable filling amount. In addition, the control section 371 has a determination section that determines whether or not the integration amount of the coarsely crushed pieces M2 exceeds the allowable filling amount.

The storage section 372 stores, for example, a program for generating the coarsely crushed pieces M2, a program for controlling the operation of the display section 36, and the like. In addition, the storage section 372 also stores the allowable filling amount acquired from the server 4, the detection data in the integration amount detector 35, the information related to the integration amount of the coarsely crushed pieces M2 in the integration section 33, and the like.

The communication section 373 is configured by, for example, an I/O interface, and has a function of communicating with the server 4 via the network, that is, transmitting and receiving a signal. The communication section 373 is an input section that acquires information related to the allowable filling amount from the server 4.

The coarsely crushed pieces M2 are generated by the coarsely crushing apparatus 3, and are integrated in the container 50 of the integration section 33. The integrated coarsely crushed pieces M2 are transported to the reserving section 12 of the sheet manufacturing apparatus 100 in a state of being contained in the container 50 by the user, and are supplied to the sheet manufacturing apparatus 100 as the raw materials.

Next, the sheet manufacturing apparatus 100 will be described.

As shown in FIG. 4, the sheet manufacturing apparatus 100 is an apparatus that obtains a sheet-shaped molded product by defibrating the supplied coarsely crushed pieces M2, mixing and accumulating a binder P1, and forming an accumulated material by a molding section 20.

The sheet manufacturing apparatus 100 shown in FIG. 4 includes an insertion port 11 for inserting the coarsely crushed pieces M2, a reserving section 12 for reserving the inserted coarsely crushed pieces M2, a defibrating section 13 for defibrating the coarsely crushed pieces M2, a sorting section 14 for sorting the defibrated material, a first web forming section 15, a subdividing section 16, a mixing section 17, a dispersion section 18, a second web forming section 19, a molding section 20, a cutting section 21, a stock section 22, a collection section 27, a display section 29, a remaining amount detector 30, and a control device 28 for controlling the operation of each of the sections.

In addition, the sheet manufacturing apparatus 100 includes a humidifying section 231, a humidifying section 232, a humidifying section 233, a humidifying section 234, a humidifying section 235, and a humidifying section 236. In addition, the sheet manufacturing apparatus 100 includes a blower 261, a blower 262, and a blower 263.

In addition, the humidifying sections 231 to 236 and the blowers 261 to 263 are electrically coupled to the control device 28, and the operations thereof are controlled by the control device 28.

In addition, in the sheet manufacturing apparatus 100, a defibrating step, a sorting step, a first web forming step, a dividing step, a mixing step, a releasing step, an accumulating step, a sheet forming step, and a cutting step are executed in this order.

Hereinafter, the configuration of each section will be described.

As shown in FIG. 5, the insertion port 11 is provided on the wall portion of a housing 10 that contains the reserving section 12. In addition, the insertion port 11 is an opening provided on the front surface of the housing 10. In addition, the insertion port 11 is provided with a door 111 that can be opened and closed, and when, the door 111 is in an opened state, the container 50 containing the coarsely crushed pieces M2 can be installed in the reserving section 12 or the empty container 50 can be installed in or taken out from the reserving section 12.

The reserving section 12 has a box-shaped or frame-shaped container loading section 121 into which the container 50 containing the coarsely crushed pieces M2 is loaded. The container loading section 121 is configured by a box body in which the container 50 is detachably installed. When the container 50 is a hard container, the container loading section 121 can be a mounting table on which the container 50 is mounted.

As shown in FIG. 5, the reserving section 12 is provided with the remaining amount detector 30 that detects a remaining amount of the coarsely crushed pieces M2 in the reserving section 12 (hereinafter, simply referred to as "remaining amount"). The remaining amount detector 30 is configured by a level sensor that detects the remaining amount, particularly the volume, of the coarsely crushed pieces M2 in the container 50 as the uppermost position of the coarsely crushed pieces M2. The remaining amount detector 30 has a plurality of optical sensors 301, that is, four in the configuration shown in the drawing. Each optical sensor 301 is disposed apart from each other along the depth direction, that is, the vertical direction of the container 50 installed in the reserving section 12.

The container loading section 121 and the container 50 are made of a substantially transparent material and have light transmittance. Each optical sensor 301 has the same configuration, operating principle, detection mechanism, and the like as the above-described optical sensor 351.

The optical sensor 301 is not limited to a reflection type, and a transmission type optical sensor can be used. In addition, a capacitance sensor can be used instead of the optical sensor.

As shown in FIGS. 2 and 5, each optical sensor 301 that constitutes the remaining amount detector 30 is electrically coupled to the control device 28, and a signal output from each optical sensor 301 is input to the control device 28. In the control device 28, a predetermined process is performed on the input signal, and information related to the remaining amount of the coarsely crushed pieces M2 in the reserving section 12 can be obtained.

The remaining amount detector 30 is not limited to the configuration shown in the drawing, and may be configured by, for example, a weight sensor that measures the weight of the coarsely crushed pieces M2 in the container 50. Even in this case, the remaining amount of the coarsely crushed pieces M2 in the reserving section 12 can be detected.

In addition, although not shown in the drawing, the reserving section 12 is coupled to a fixed-quantity supply section that quantitatively sends the coarsely crushed pieces M2 reserved in the reserving section 12 to the defibrating section 13. The coarsely crushed pieces M2 sent by the fixed-quantity supply section are transported to the defibrating section 13 through a pipe 241.

As shown in FIG. 4, the defibrating section 13 is a part that performs the defibrating step of defibrating the coarsely crushed pieces M2 in the air, that is, by a dry method. By performing the defibrating process in the defibrating section 13, the defibrated material M3 can be generated from the coarsely crushed pieces M2. Here, "defibrating" means unraveling the coarsely crushed pieces M2 in which a plurality of fibers are bound into individual fibers. Then, the unraveled material becomes the defibrated material M3. The shape of the defibrated material M3 is a linear shape or a band shape. In addition, the defibrated material M3 may be present in a state of being entangled with each other to form a lump, that is, in a state of forming a so-called "lump".

For example, in the present embodiment, the defibrating section 13 is configured by an impeller mill having a rotary blade rotating at high speed and a liner located on the outer periphery of the rotary blade. The coarsely crushed pieces M2 that have flowed into the defibrating section 13 are agglomerated by being sandwiched between the rotary blade and the liner.

In addition, the defibrating section 13 can generate a flow of air, that is, an airflow from the reserving section 12 toward the sorting section 14 due to the rotation of the rotary blade. As a result, the coarsely crushed pieces M2 can be sucked from the pipe 241 to the defibrating section 13. In addition, after the defibrating process, the defibrated material M3 can be sent to the sorting section 14 through the pipe 242.

The blower 261 is installed in the middle of the pipe 242. The blower 261 is an airflow generation device that generates airflow toward the sorting section 14. As a result, the sending of the defibrated material M3 to the sorting section 14 is promoted.

The sorting section 14 is a part that performs the sorting step of sorting the defibrated material M3 according to the length of the fiber. In the sorting section 14, the defibrated material M3 is sorted into a first sorted material M4-1 and a second sorted material M4-2 which is larger than the first sorted material M4-1. The first sorted material M4-1 has a size suitable for manufacturing the subsequent recycled paper S. It is preferable that the average length thereof is 1 µm or more and 30 µm or less. On the other hand, the second sorted material M4-2 includes, for example, a material with insufficient defibration, a material in which the defibrated fibers are excessively agglomerated, and the like.

The sorting section 14 has a drum section 141 and a housing section 142 that houses the drum section 141.

The drum section 141 is a sieve that is formed of a net body having a cylindrical shape and rotates around a central axis thereof. The defibrated material M3 flows into the drum section 141. Then, when the drum section 141 rotates, the defibrated material M3 smaller than the mesh opening of the net is sorted as the first sorted material M4-1, and the defibrated material M3 having a size which is equal to or larger than the mesh opening of the net is sorted as the second sorted material M4-2.

The first sorted material M4-1 falls from the drum section 141.

On the other hand, the second sorted material M4-2 is sent to a pipe 243 coupled to the drum section 141. The pipe 243 is coupled to the pipe 241 on a side opposite to the drum section 141, that is, upstream. The second sorted material M4-2 that passes through the pipe 243 merges with the coarsely crushed pieces M2 in the pipe 241 and flows into the defibrating section 13 together with the coarsely crushed pieces M2. As a result, the second sorted material M4-2 is returned to the defibrating section 13, and the defibrating process is performed thereon, together with the coarsely crushed pieces M2.

In addition, the first sorted material M4-1 that falls from the drum section 141 falls while being dispersed in the air, and is directed for the first web forming section 15 located downward the drum section 141. The first web forming section 15 is a part that performs the first web forming step of forming the first web M5 from the first sorted material M4-1. The first web forming section 15 includes a mesh belt 151, three tension rollers 152, and a suction section 153.

The mesh belt 151 is an endless belt on which the first sorted material M4-1 is accumulated. The mesh belt 151 is hung around the three tension rollers 152. Then, the first sorted material M4-1 on the mesh belt 151 is transported downstream by the rotational drive of the tension rollers 152.

The first sorted material M4-1 has a size which is equal to or larger than the mesh opening of the mesh belt 151. As a result, the first sorted material M4-1 is restricted to pass through the mesh belt 151, and thus the first sorted material M4-1 can be accumulated on the mesh belt 151. In addition, since the first sorted material M4-1 is transported downstream for each the mesh belt 151 while being accumulated on the mesh belt 151, the first sorted material M4-1 is formed as a layer-shape first web M5.

In addition, there is a problem in that, for example, dust, dirt, and the like are mixed in the first sorted material M4-1. The dust and the dirt may be generated, for example, by coarsely crushing or defibrating. Then, such dust and dirt will be collected by the collection section 27, which will be described later.

The suction section 153 is a suction mechanism that sucks air from downward the mesh belt 151. As a result, the dust and dirt that pass through the mesh belt 151 can be sucked together with the air.

In addition, the suction section 153 is coupled to the collection section 27 through a pipe 244. The dust and dirt sucked by the suction section 153 are collected by the collection section 27.

A pipe 245 is further coupled to the collection section 27. The blower 262 is installed in the middle of the pipe 245. Due to the operation of the blower 262, a suction force can be generated in the suction section 153. As a result, the formation of the first web M5 on the mesh belt 151 is prompted. The first web M5 is obtained by removing the dust, the dirt, and the like. In addition, the dust and dirt pass through the pipe 244 and reach the collection section 27 by the operation of the blower 262.

The housing section 142 is coupled to the humidifying section 232. The humidifying section 232 is configured by a vaporization type humidifier. As a result, humidified air is supplied into the housing section 142. The first sorted material M4-1 can be humidified by the humidified air, and thus it is also possible to suppress the first sorted material M4-1 from adhering to the inner wall of the housing section 142 due to electrostatic force.

The humidifying section 235 is disposed downstream the sorting section 14. The humidifying section 235 is configured by an ultrasonic humidifier that sprays water. As a result, water can be supplied to the first web M5, and thus the water content of the first web M5 is adjusted. With the adjustment, the adsorption of the first web M5 to the mesh belt 151 due to the electrostatic force can be suppressed. As a result, the first web M5 is easily peeled off from the mesh belt 151 at a position where the mesh belt 151 is folded back by the tension roller 152.

The subdividing section 16 is disposed downstream the humidifying section 235. The subdividing section 16 is a part that performs the dividing step of dividing the first web M5 peeled from the mesh belt 151. The subdividing section 16 has a rotatably supported propeller 161 and a housing section 162 for housing the propeller 161. Then, the first web M5 can be divided by the rotating propeller 161. The first web M5 obtained through the division becomes the subdivided bodies M6. In addition, the subdivided bodies M6 descend in the housing section 162.

The housing section 162 is coupled to the humidifying section 233. The humidifying section 233 is configured by a vaporization type humidifier. As a result, humidified air is supplied into the housing section 162. Due to the humidified air, it is possible to suppress the subdivided bodies M6 from adhering to the inner wall of the propeller 161 or the housing section 162 due to electrostatic force.

A mixing section 17 is disposed downstream the subdividing section 16. The mixing section 17 is a part that performs the mixing step of mixing the subdivided bodies M6 and an additive. The mixing section 17 includes an additive supply section 171, a pipe 172, and a blower 173.

The pipe 172 is coupled to the housing section 162 of the subdividing section 16 and the housing 182 of the dispersion section 18, and is a flow path through which the mixture M7 of the subdivided bodies M6 and the additive passes.

The additive supply section 171 is coupled to the middle of the pipe 172. The additive supply section 171 has a housing section 170 in which the additive is contained and a screw feeder 174 which is provided in the housing section 170. Due to the rotation of the screw feeder 174, the additive in the housing section 170 is pushed out from the housing section 170 and supplied into the pipe 172. The additive supplied into the pipe 172 is mixed with the subdivided bodies M6 to form the mixture M7.

Here, examples of the additive supplied from the additive supply section 171 include a binder for binding fibers to each other, a colorant for coloring the fibers, an agglomeration suppressant for suppressing agglomeration of the fibers, a flame retardant for making fibers and the like less flammable, a paper strength enhancer for enhancing the paper strength of the recycled paper S, a defibrated material, and the like, and one or more of these can be used in combination. Hereinafter, a case where the additive is the binder P1 will be described as an example. When the additive contains the binder P1 that combines the fibers to each other, the strength of the recycled paper S can be increased.

Examples of the binder P1 include ingredients derived from natural products, such as starch, dextrin, glycogen, amylose, hyaluronic acid, kudzu, konjac, dogtooth violet starch, etherified starch, esterified starch, natural gum glue (etherified tamarind gum, etherified locust bean gum, etherified guar gum, or acacia arabic gum), fiber inducing glue (etherified carboxymethyl cellulose or hydroxyethyl cellulose), seaweed (sodium alginate or agar), and animal protein (collagen, gelatin, hydrolyzed collagen, or sericin), or polyvinyl alcohol, polyacrylic acid, polyacrylamide, and the like. One or two or more selected from these can be used in combination. However, the ingredients derived from natural products are preferable, and the starch is more preferable. In addition, it is also possible to use a thermoplastic resin. Examples of the thermoplastic resin include AS resin, ABS resin, polyolefins such as polyethylene, polypropylene, ethylene-vinyl acetate copolymer (EVA), modified polyolefin, acrylic resin such as polymethyl methacrylate, polyester such as polyvinyl chloride, polystyrene, polyethylene terephthalate, or polybutylene terephthalate, polyamides (nylons) such as nylon 6, nylon 46, nylon 66, nylon 610, nylon 612, nylon 11, nylon 12, nylon 6-12, and nylon 6-66, liquid crystal polymers such as polyphenylene ether, polyacetal, polyether, polyphenylene oxide, polyetheretherketone, polycarbonate, polyphenylene sulfide, thermoplastic polyimide, polyetherimide, and aromatic polyester, and various thermoplastic elastomers such as styrene, polyolefin, polyvinyl chloride, polyurethane, polyester, polyamide, polybutadiene, transpolyisoprene, fluororubber, and chlorinated polyethylene. One or two or more selected from these can be used in combination. Preferably, as the thermoplastic resin, polyester or a material containing polyester is used.

In addition to the binder P1, the additive supplied from the additive supply section 171 may include, for example, a colorant for coloring the fibers, an agglomeration suppressant for suppressing agglomeration of the fibers or the binder P1, a flame retardant for making fibers and the like less flammable, a paper strength enhancer for enhancing the paper strength of the sheet S, and the like. Alternatively, an object obtained by including the additives in the binder P1 in advance to form a composite may be supplied from the additive supply section 171.

In addition, in the middle of the pipe 172, the blower 173 is installed downstream rather than the additive supply section 171. The mixing of the subdivided bodies M6 and the binder P1 is promoted due to the action of the rotating section, such as a blade, of the blower 173. In addition, the blower 173 can generate airflow toward the dispersion section 18. The subdivided bodies M6 and the binder P1 can be stirred in the pipe 172 by the airflow. As a result, the mixture M7 is transported to the dispersion section 18 in a state in which the subdivided bodies M6 and the binder P1 are uniformly dispersed. In addition, the subdivided bodies M6 in the mixture M7 are loosened in a process of passing through the pipe 172 to become a finer fiber form.

The blower 173 is electrically coupled to the control device 28, and the operation thereof is controlled. In addition, by adjusting the airflow rate of the blower 173, the amount of air sent into a drum 181 can be adjusted.

Although not shown in the drawing, the end of the pipe 172 on the side of the drum 181 branches into two, and the branching ends are coupled to inlets (not shown) formed on the end surface of the drum 181, respectively.

The dispersion section 18 shown in FIG. 4 is a part that performs the releasing step of loosening and releasing the fibers intertwined with each other in the mixture M7. The dispersion section 18 includes the drum 181 that introduces and releases the mixture M7 that is the defibrated material, and the housing 182 that houses the drum 181.

The drum 181 is a sieve that is formed of a net body having a cylindrical shape and rotates around a central axis thereof. When the drum 181 rotates, the fibers or the like, which are smaller than the mesh opening, in the mixture M7 can pass through the drum 181. At that time, the mixture M7 is loosened and released together with the air. That is, the drum 181 functions as a release section that releases a material containing the fiber.

The drum 181 is coupled to a drive source (not shown), and rotates by a rotational force output from the drive source. The drive source is electrically coupled to the control device 28, and the operation thereof is controlled.

In addition, the housing 182 is coupled to the humidifying section 234. The humidifying section 234 is configured by a vaporization type humidifier. As a result, humidified air is supplied into the housing 182. The inside of the housing 182 can be humidified by the humidified air, and thus it is possible to suppress the mixture M7 from adhering to the inner wall of the housing 182 due to electrostatic force.

In addition, the mixture M7 released by the drum 181 falls while being dispersed in the air, and is directed for the second web forming section 19 located downward the drum 181. The second web forming section 19 is a part that performs the accumulating step of accumulating the mixture M7 to form the second web M8 which is the accumulated material. The second web forming section 19 has a mesh belt 191, a tension roller 192, and a suction section 193.

The mesh belt 191 is a mesh member, and is configured by an endless belt in the configuration shown in the drawing. In addition, the mixture M7 dispersed and released by the dispersion section 18 is accumulated on the mesh belt 191. The mesh belt 191 is hung around four tension rollers 192. Then, due to the rotational drive of the tension roller 192, the mixture M7 on the mesh belt 191 is transported downstream.

In the configuration shown in the drawing, a configuration in which the mesh belt 191 is used as an example of the mesh member is described, but the present disclosure is not limited thereto, and, for example, a flat plate shape may be used.

In addition, most of the mixture M7 on the mesh belt 191 has a size which is equal to or larger than the mesh opening of the mesh belt 191. As a result, the mixture M7 is restricted from passing through the mesh belt 191, and thus the mixture M7 can be accumulated on the mesh belt 191. In addition, since the mixture M7 is transported downstream for each the mesh belt 191 while being accumulated on the mesh belt 191, the mixture M7 is formed as a layer-shape second web M8.

The suction section 193 is a suction mechanism that sucks air from downward the mesh belt 191. As a result, the mixture M7 can be sucked onto the mesh belt 191, and thus the accumulation of the mixture M7 on the mesh belt 191 is promoted.

A pipe 246 is coupled to the suction section 193. A blower 263 is installed in the middle of the pipe 246. Due to the operation of the blower 263, a suction force can be generated in the suction section 193.

The humidifying section 236 is disposed downstream the dispersion section 18. The humidifying section 236 is configured by an ultrasonic humidifier similar to the humidifying section 235. As a result, water can be supplied to the second web M8, and thus the water content of the second web M8 is adjusted. By the adjustment, the adsorption of the second web M8 to the mesh belt 191 due to the electrostatic force can be suppressed. As a result, the second web M8 is easily peeled off from the mesh belt 191 at a position where the mesh belt 191 is folded back by the tension roller 192.

It is preferable that the total water content added to the humidifying sections 231 to 236 is 0.5 parts by mass or more and 20 parts by mass or less with respect to 100 parts by mass of the material before humidification.

The molding section 20 is disposed downstream the second web forming section 19. The molding section 20 is a part that performs the sheet forming step of forming the recycled paper S from the second web M8. The molding section 20 has a pressurizing section 201 and a heating section 202.

The pressurizing section 201 has a pair of calendar rollers 203, and can pressurize the second web M8 between the calendar rollers 203 without heating. As a result, the density of the second web M8 is increased. It is preferable that the degree of heating when heating is, for example, a degree in which the binder P1 is not melted. Then, the second web M8 is transported toward the heating section 202. One of the pair of calendar rollers 203 is a driving roller driven by an operation of a motor (not shown), and the other is a driven roller.

The heating section 202 has a pair of heating rollers 204, and can pressurize the second web M8 while heating the second web M8 between the heating rollers 204. By heating and pressurizing, the binder P1 is melted in the second web M8, and the fibers are bonded to each other via the melted binder P1. As a result, the recycled paper S is formed. Then, the recycled paper S is transported toward the cutting section 21. One of the pair of heating rollers 204 is the driving roller driven by the operation of the motor (not shown), and the other is the driven roller.

The cutting section 21 is disposed downstream the molding section 20. The cutting section 21 is a part that performs the cutting step of cutting the recycled paper S. The cutting section 21 has a first cutter 211 and a second cutter 212.

The first cutter 211 cuts the recycled paper S in a direction intersecting the transport direction of the recycled paper S, particularly in a direction orthogonal to the transport direction.

The second cutter 212 cuts the recycled paper S in a direction parallel to the transport direction of the recycled paper S downstream the first cutter 211. The cutting is removing unnecessary parts of both ends of the recycled paper S in the width direction to adjust the width of the recycled paper S, and the cut and removed parts are so-called "ears".

By the cutting with the first cutter 211 and the second cutter 212, the recycled paper S having a desired shape and size can be obtained. Then, the recycled paper S is transported further downstream and laid in the stock section 22.

Each section of the sheet manufacturing apparatus 100 is electrically coupled to the control device 28. The operation of each of the sections is controlled by the control device 28.

The display section 29 shown in FIG. 2 is a display provided at an arbitrary position outside the housing of the sheet manufacturing apparatus 100. Examples of the type of the display include a liquid crystal display, an organic EL display, and the like. The display section 29 is driven by the control device 28 to control the display content.

As shown in FIG. 2, the control device 28 includes a control section 281, a storage section 282, and a communication section 283.

The control section 281 has at least one processor and executes various programs stored in the storage section 282. As the processor, for example, a Central Processing Unit (CPU) can be used. In addition, the control section 281 has various functions such as a function of controlling the drive of each section, which is related to sheet manufacturing, of the sheet manufacturing apparatus 100, a function of controlling the drive of the display section 29, a function of acquiring information related to the integration amount from the server 4, a function of generating display information related to the integration amount based on the information related to the integration amount, a function of calculating the allowable filling amount of the coarsely crushed pieces M2 in the reserving section 12, a function of transmitting the information related to the calculated allowable filling amount to the server 4, and a function of transmitting and receiving a device ID and a user ID, which will be described later. That is, the control section 281 has a calculation section that calculates the allowable filling amount of the coarsely crushed pieces M2 in the reserving section 12.

The storage section 282 stores, for example, a program for controlling the drive of the display section 29, a detection result of the remaining amount detector 30, that is, the remaining amount of the coarsely crushed pieces M2 in the reserving section 12, the maximum capacity of the reserving section 12, information related to the calculated allowable filling amount of the coarsely crushed pieces M2 in the reserving section 12, and the like.

The communication section 283 is configured by, for example, an I/O interface and has a function of communicating with the server 4 via the network, that is, transmitting and receiving a signal. The communication section 283 is an output section that transmits information related to the calculated allowable filling amount to the server 4.

The control device 28 may be built in the sheet manufacturing apparatus 100 or may be provided in an external device such as an external computer. In addition, for example, the control section 281 and the storage section 282 may be integrated to be configured as one unit, or the control section 281 is built in the sheet manufacturing apparatus 100 and the storage section 282 may be provided in an external device such as an external computer, or the storage section 282 may be built in the sheet manufacturing apparatus 100 and the control section 281 may be provided in an external device such as an external computer.

The configuration of the sheet manufacturing system 1 is described above. In the sheet manufacturing system 1, it is necessary that the user grasps the amount of the coarsely crushed pieces M2 inside the coarsely crushing apparatus 3 and the sheet manufacturing apparatus 100, and, if necessary, replenishes the coarsely crushed pieces M2 integrated inside the coarsely crushing apparatus 3 in the reserving section 12 of the sheet manufacturing apparatus 100. Therefore, it is preferable that the user grasps the amount, that is, the integration amount and the remaining amount of the coarsely crushed pieces M2 inside the coarsely crushing apparatus 3 and the sheet manufacturing apparatus 100. However, it is assumed that, for example, the coarsely crushing apparatus 3 and the sheet manufacturing apparatus 100 are installed and used on different floors or in different rooms. In this case, there is a problem in that it is difficult for the user to grasp both the integration amount of the coarsely crushed pieces M2 in the coarsely crushing apparatus 3 and the remaining amount of the coarsely crushed pieces M2 in the sheet manufacturing apparatus 100, so that it is difficult to determine the transport of the coarsely crushed pieces M2 from the coarsely crushing apparatus 3 to the sheet manufacturing apparatus 100. On the other hand, in the present disclosure, the problem can be solved. The details will be described below.

As described above, the sheet manufacturing apparatus 100 has the remaining amount detector 30 that detects the remaining amount of the coarsely crushed pieces M2 in the reserving section 12. The control device 28 calculates the allowable filling amount of the coarsely crushed pieces M2 in the reserving section 12, that is, the empty capacity, based on the remaining amount which is the detection result of the remaining amount detector 30 and the maximum capacity of the reserving section 12.

The "allowable filling amount of the coarsely crushed pieces M2" in the reserving section 12 refers to an amount obtained by subtracting the amount of the coarsely crushed pieces M2 that are currently reserved from the maximum amount of the coarsely crushed pieces M2 that can be filled in the reserving section 12. The allowable filling amount of the coarsely crushed pieces M2 is also simply referred to as "allowable filling amount" below. The unit of the allowable filling amount may be the weight or volume of the coarsely crushed pieces M2. In the latter case, the "allowable filling amount of the coarsely crushed pieces M2" is also generally referred to as the empty capacity of the reserving section 12. In addition, the allowable filling amount may be a ratio of the amount of the coarsely crushed pieces M2 currently reserved to the maximum amount of the coarsely crushed pieces M2 that can be filled in the reserving section 12, particularly a volume ratio or a weight ratio, and the unit in this case can be (%).

When the container 50 is loaded into the reserving section 12 of the sheet manufacturing apparatus 100, the allowable filling amount of the reserving section 12 is the allowable filling amount of the loaded container 50.

The control device 28 outputs the information related to the allowable filling amount to the server 4. As above, the sheet manufacturing apparatus 100 grasps the remaining amount of the coarsely crushed pieces M2 in the reserving section 12 of the sheet manufacturing apparatus 100, and calculates how much degree of amount of coarsely crushed pieces M2 can be contained based on the known maximum capacity of the reserving section 12, and transmits the calculated information to the server 4.

The server 4 transmits the information related to the allowable filling amount received from the control device 28 to the control device 37 of the coarsely crushing apparatus 3. The control device 37 acquires the information related to the allowable filling amount from the server 4, generates the display information related to the allowable filling amount, and displays the display information on the display section 36.

As shown in FIG. 6, the information related to the allowable filling amount is displayed on the display section 36 of the coarsely crushing apparatus 3. Specifically, the allowable filling amount is displayed on the indicator 361 of the display section 36 as turning on/turning off of the bar index, and the allowable filling amount is displayed as the quantified information on the lower side of the indicator 361.

The indicator 361 visually indicates the ratio of the current filling amount to the maximum capacity of the reserving section 12. As a result, the user can grasp at a glance the ratio of the remaining amount of the coarsely crushed pieces M2 to the maximum capacity of the reserving section 12. Therefore, the user can easily and accurately grasp the allowable filling amount.

In addition, on the lower side of the indicator 361, a numerical value indicating the ratio of the allowable filling amount to the maximum capacity of the reserving section 12 is displayed. Specifically, the allowable filling amount is displayed as "75%". As a result, the user can grasp at a glance the ratio of the allowable filling amount to the maximum capacity of the reserving section 12. Therefore, the user can easily and accurately grasp the allowable filling amount.

The present disclosure is not limited to the configuration, and the numerical value may be a value indicating the weight or volume of the allowable filling amount. In addition, the display form may be something other than numerical values, for example, text such as alphabets, symbols, figures, patterns, or something including these.

According to the configuration, a user near the coarsely crushing apparatus 3 looks at the display section 36 and can obtain information related to the allowable filling amount of the sheet manufacturing apparatus 100. Therefore, it is possible to easily and appropriately determine at what timing the coarsely crushed pieces M2 in the coarsely crushing apparatus 3 should be transported to the sheet manufacturing apparatus 100.

As described above, the sheet manufacturing system 1 of the present disclosure includes the coarsely crushing apparatus 3 that coarsely crushes the paper M1, the sheet manufacturing apparatus 100 that generates the sheet-shaped recycled paper S using the coarsely crushed pieces M2 of the paper M1 as the raw material, and the server 4 that is coupled to the coarsely crushing apparatus 3 and the sheet manufacturing apparatus 100 via the network. In addition, the sheet manufacturing apparatus 100 has a reserving section 12 that reserves the coarsely crushed pieces M2, a remaining amount detector 30 that detects the remaining amount of the coarsely crushed pieces M2 in the reserving section 12, a control section 281 as a calculation section that calculates the allowable filling amount of the coarsely crushed pieces M2 in the reserving section 12 based on the detection result of the remaining amount detector 30, and a communication section 283 as an output section that transmits information related to the calculated allowable filling amount to the server 4. In addition, the coarsely crushing apparatus 3 has an integration section 33 that integrates the coarsely crushed pieces M2, a communication section 373 as an input section that acquires information related to the allowable filling amount from the server 4, a control section 371 as a display information generation section that generates display information related to the allowable filling amount based on the information acquired by the communication section 373, and a display section 36 that displays the display information. According to the configuration, on the side of the coarsely crushing apparatus 3, it is possible to obtain information on the side of the sheet manufacturing apparatus 100, particularly, information related to the allowable filling amount of the reserving section 12, which is derived from the remaining amount of the coarsely crushed pieces M2 in the reserving section 12. As a result, it is possible to easily and appropriately determine the transport of the coarsely crushed pieces M2 from the coarsely crushing apparatus 3 to the sheet manufacturing apparatus 100.

In addition, as described above, the display information is information obtained by quantifying the allowable filling amount. As a result, it is possible to more easily and accurately grasp the display information. As a result, it is possible to more easily, quickly, and appropriately perform the determination of the transport of the coarsely crushed pieces M2 from the coarsely crushing apparatus 3 to the sheet manufacturing apparatus 100.

In addition, the control section 371 can display the determination result of whether or not the integration amount exceeds the allowable filling amount on the display section 36, for example, by using text or symbols. That is, the display information generated by the control section 371 includes information related to a determination result of whether or not the integration amount exceeds the allowable filling amount.

The control section 371 compares the integration amount detected by the integration amount detector 35 with the information related to the allowable filling amount acquired from the server 4, and determines whether or not the integration amount exceeds the allowable filling amount. When it is determined that the integration amount does not exceed the allowable filling amount, the total amount of the coarsely crushed pieces M2 in the coarsely crushing apparatus 3 can be inserted into the sheet manufacturing apparatus 100. Therefore, as shown in FIG. 6, the lower portion of the display section 36 displays text "transport to the sheet manufacturing apparatus is possible".

The same container 50 having the same capacity is used for the reserving section 12 and the integration section 33. Then, as shown in FIGS. 6 and 7, the allowable filling amount of the reserving section 12 is 75%, and the integration amount of the integration section 33 is 50%. As a result, since the allowable filling amount>the integration amount, it is possible to determine that it is possible to transport the total integration amount to the reserving section 12 of the sheet manufacturing apparatus 100 for replenishment.

On the other hand, when the control section 371 determines that the integration amount exceeds the allowable filling amount, the total amount of the coarsely crushed pieces M2 in the coarsely crushing apparatus 3 cannot be inserted into the sheet manufacturing apparatus 100. Therefore, although not shown in the drawing, the lower portion of the display section 36 displays text "transport to the sheet manufacturing apparatus is not possible".

As above, the coarsely crushing apparatus 3 determines whether or not the integration amount of the integration section 33 exceeds the allowable filling amount of the reserving section 12, and displays the determination result on the display section 36. As a result, the user can know whether or not the total amount of the integration amount of the coarsely crushed pieces M2 can be transported and inserted to the sheet manufacturing apparatus 100 on the side of the coarsely crushing apparatus 3. Therefore, it is possible to prevent wasteful operation in which replenishment is not possible even though transport is performed based on estimation that the total integration amount of the coarsely crushed pieces M2 can be inserted to the sheet manufacturing apparatus 100, so that it is possible to transport and replenish the coarsely crushed pieces M2 at an appropriate timing based on appropriate determination.

As above, the coarsely crushing apparatus 3 has the control section 371 as the determination section that determines whether or not the integration amount exceeds the allowable filling amount based on the integration amount detected by the integration amount detector 35 and the information related to the allowable filling amount acquired from the server 4, the display information includes information related to the determination result in the control section 371. As a result, it is possible to easily know whether or not the integration amount of the integration section 33 of the coarsely crushing apparatus 3 exceeds the allowable filling amount of the reserving section 12 of the sheet manufacturing apparatus 100. As a result, it is possible to more easily, quickly, and appropriately perform the determination of the transport of the coarsely crushed pieces M2 from the coarsely crushing apparatus 3 to the sheet manufacturing apparatus 100.

The advantages on the side of the coarsely crushing apparatus 3 are described above. Next, the advantages on the side of the sheet manufacturing apparatus 100 will be described.

The sheet manufacturing apparatus 100 acquires the information related to the integration amount of the coarsely crushing apparatus 3 from the server 4, generates the display information, and displays the display information on the display section 29. As a result, on the side of the sheet manufacturing apparatus 100, information on the side of the coarsely crushing apparatus 3, particularly, information related to the integration amount of the coarsely crushed pieces M2 in the integration section 33 can be obtained, and, as a result, it is possible to more easily and appropriately determine the transport of the coarsely crushed pieces M2 from the coarsely crushing apparatus 3 to 100 to the sheet manufacturing apparatus 100.

As shown in FIG. 7, the display section 29 of the sheet manufacturing apparatus 100 displays information related to the integration amount in the integration section 33 of the coarsely crushing apparatus 3 as the display information. Specifically, the integration amount is displayed as turning on/turning off of a bar index on the indicator 291 of the display section 29, and the integration amount is displayed as quantified information on the lower side of the indicator 291.

The indicator 291 visually indicates the ratio of the current integration amount to the maximum capacity of the integration section 33. As a result, the user can grasp at a glance the ratio of the current integration amount to the maximum capacity of the integration section 33. Therefore, the user can easily and accurately grasp the integration amount.

In addition, on the lower side of the indicator 291, a numerical value indicating the ratio of the current integration amount to the maximum capacity of the integration section 33 is displayed. Specifically, the integration amount is displayed as "50%". As a result, the user can easily grasp the ratio of the current integration amount to the maximum capacity of the integration section 33. Therefore, the user can easily and accurately grasp the integration amount.

The present disclosure is not limited to the configuration, and the numerical value may be a value indicating the weight or volume of the integration amount. In addition, the display form may be something other than numerical values, for example, text such as alphabets, symbols, figures, patterns, or something including these.

In addition, the control section 281 displays the determination result of whether or not the integration amount exceeds the allowable filling amount on the display section 36. That is, the display information generated by the control section 281 includes information related to a determination result of whether or not the integration amount exceeds the allowable filling amount.

The control section 281 compares the integration amount detected by the integration amount detector 35 with the information related to the allowable filling amount acquired from the server 4, and determines whether or not the integration amount exceeds the allowable filling amount. When it is determined that the integration amount does not exceed the allowable filling amount, the total amount of the coarsely crushed pieces M2 in the coarsely crushing apparatus 3 can be inserted into the sheet manufacturing apparatus 100. Therefore, as shown in FIG. 7, text "transport is possible from the coarsely crushing apparatus" is displayed at the lower portion of the display section 29.

The same container 50 having the same capacity is used for the reserving section 12 and the integration section 33. Then, as shown in FIGS. 6 and 7, the allowable filling amount of the reserving section 12 is 75%, and the integration amount of the integration section 33 is 50%. As a result, since the allowable filling amount>the integration amount, it is possible to determine that it is possible to transport the total integration amount to the reserving section 12 of the sheet manufacturing apparatus 100 for replenishment.

On the other hand, when the control section 281 determines that the integration amount exceeds the allowable filling amount, the total amount of the coarsely crushed pieces M2 in the coarsely crushing apparatus 3 cannot be inserted into the sheet manufacturing apparatus 100. Therefore, although not shown in the drawing, text "transported from the coarsely crushing apparatus is not possible" is displayed at the lower portion of the display section 29.

As above, in the sheet manufacturing apparatus 100, it is determined whether or not the integration amount of the integration section 33 exceeds the allowable filling amount of the reserving section 12, and a determination result is displayed on the display section 29. As a result, the user can know whether or not the total amount of the integration amount of the coarsely crushed pieces M2 can be transported and inserted to the sheet manufacturing apparatus 100 on the side of the sheet manufacturing apparatus 100. Therefore, it is possible to prevent wasteful operation in which replenishment is not possible even though transport is performed based on estimation that the total integration amount of the coarsely crushed pieces M2 can be inserted to the sheet manufacturing apparatus 100, so that it is possible to transport and replenish the coarsely crushed pieces M2 at an appropriate timing based on appropriate determination.

In the present embodiment, the configuration is described in which each of the control section 371 and the control section 281 determines whether or not the integration amount exceeds the allowable filling amount. However, the present disclosure is not limited thereto, and a configuration may be provided in which the control section of the server 4 performs the determination, the information related to the determination result is transmitted to the sheet manufacturing apparatus 100 and the coarsely crushing apparatus 3, and each of the display section 29 and the display section 36 displays the determination result. In this case, a configuration is possible in which the display section 29 and the display section 36 are driven in conjunction with each other, and all or some of the display content is the same.

In addition, the storage section 282 of the sheet manufacturing apparatus 100 stores specific information that specifies a device ID that specifies the sheet manufacturing apparatus 100 and a user ID that specifies a user who uses the sheet manufacturing apparatus 100.

The device ID is information such as a manufacturing number, a manufacturing date, a model number, and a manufacturing location. The user ID is information such as a company name, a corporate name, and an individual name. Such specific information is transmitted to the server 4 in a state of being associated with the information related to the allowable filling amount transmitted from the communication section 283.

As above, the sheet manufacturing apparatus 100 has the specific information of at least one of the device ID specifying the sheet manufacturing apparatus 100 and the user ID specifying the user using the sheet manufacturing apparatus 100, and the information related to the allowable filling amount transmitted from the communication section 283 which is the output section is associated with the specific information. As a result, not only when there is a single sheet manufacturing apparatus 100 but also when there are a plurality of sheet manufacturing apparatuses 100, it is possible to easily associate the coarsely crushing apparatus 3 with the sheet manufacturing apparatus 100, and it is possible to easily and appropriately perform management in the sheet manufacturing system 1. In addition, not only when there is one user who uses the sheet manufacturing apparatus 100 but also when there are a plurality of users, it is possible to easily associate the coarsely crushing apparatus 3 with the user of the sheet manufacturing apparatus 100, it is possible to easily and appropriately perform management in the sheet manufacturing system 1.

The sheet manufacturing apparatus 100 may be configured to transmit, for example, operation information of the apparatus, such as status information such as power ON/OFF, sheet manufacturing/standby, and the like, to the server 4.

In addition, similarly to the sheet manufacturing apparatus 100, the coarsely crushing apparatus 3 may be configured to transmit the device ID that specifies the device, the user ID who uses the device, and, for example, operation information of the apparatus, such as status information of power ON/OFF, sheet manufacturing/standby, and the like to the server 4.

In this case, it is determined whether the user ID of the sheet manufacturing apparatus 100 matches the user ID of the coarsely crushing apparatus 3. When the user ID of the sheet manufacturing apparatus 100 does not match the user ID of the coarsely crushing apparatus 3, it is determined to be, for example, out of the group of the sheet manufacturing system 1, that is, out of the subject of the transport, and the fact may be displayed on the display section 36 or the display section 29.

Second Embodiment

Figure 8:
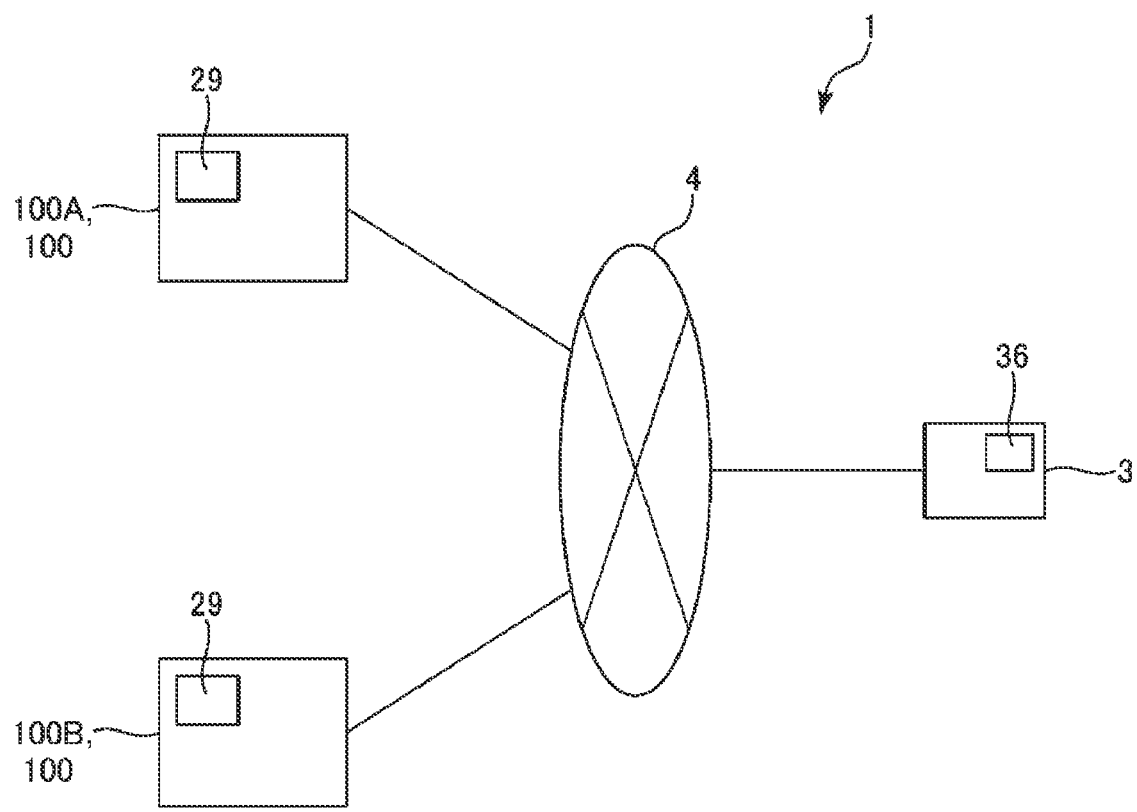
FIG. 8 is a schematic configuration diagram of a sheet manufacturing system according to a second embodiment.
Figure 9:
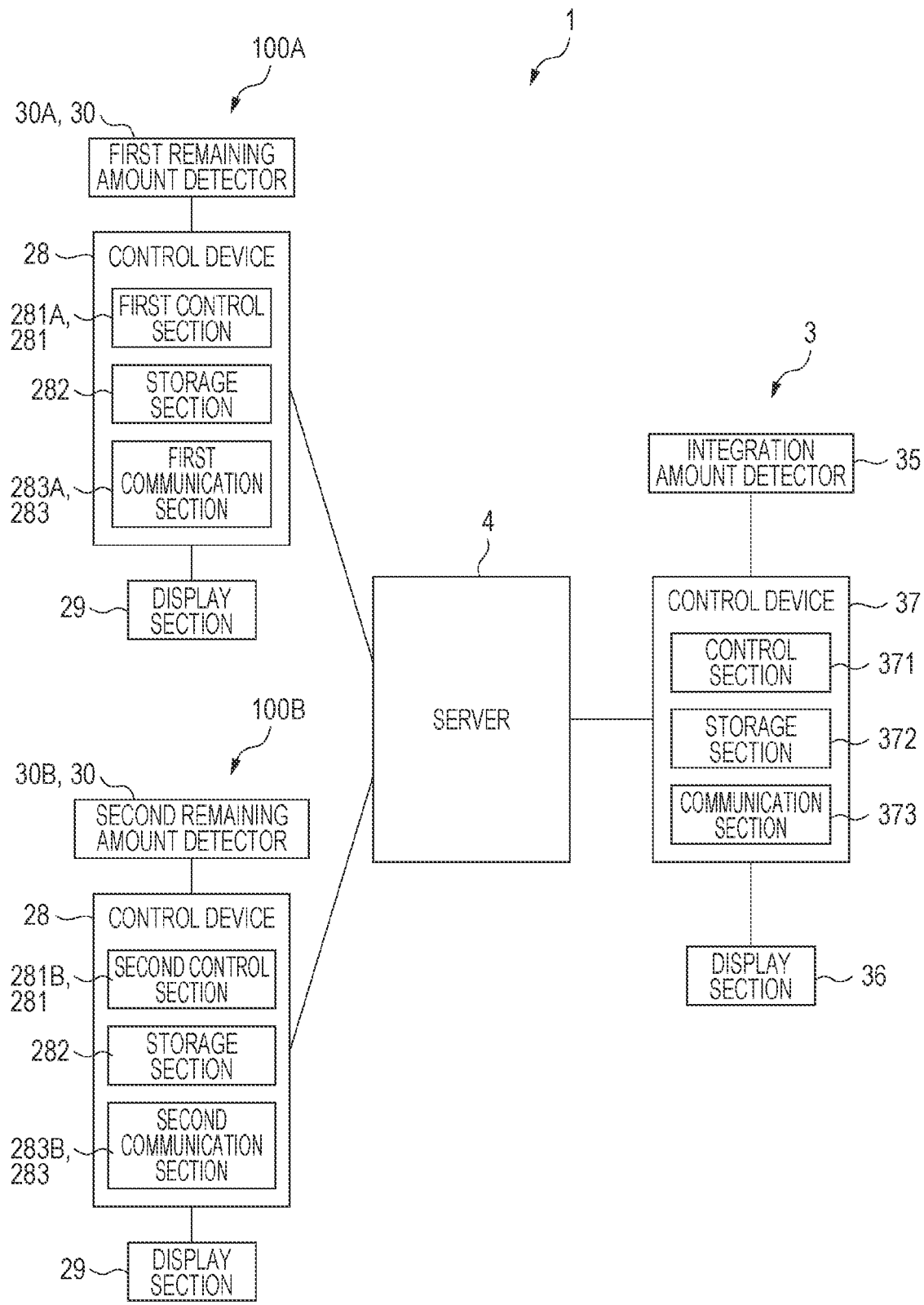
FIG. 9 is a block diagram of the sheet manufacturing system shown in FIG. 8.

FIG. 8 is a schematic configuration diagram of a sheet manufacturing system according to a second embodiment. FIG. 9 is a block diagram of the sheet manufacturing system shown in FIG. 8.

Hereinafter, a second embodiment of the sheet manufacturing system of the present disclosure will be described with reference to FIGS. 8 and 9, and differences from the first embodiment will be described below, and the description of the common points will not be repeated.

As shown in FIGS. 8 and 9, the sheet manufacturing system 1 includes one coarsely crushing apparatuses 3, two sheet manufacturing apparatuses 100, and a server 4. Hereinafter, one of the two sheet manufacturing apparatuses 100 is referred to as a first sheet manufacturing apparatus 100A, and the other is referred to as a second sheet manufacturing apparatus 100B.

Each of the first sheet manufacturing apparatus 100A and the second sheet manufacturing apparatus 100B has the same configuration as the above-described sheet manufacturing apparatus 100. However, the first sheet manufacturing apparatus 100A and the second sheet manufacturing apparatus 100B may have not only the same configuration but also a partially different configuration.

The coarsely crushing apparatus 3, the first sheet manufacturing apparatus 100A, and the second sheet manufacturing apparatus 100B are installed at separate locations from each other, for example, on different floors in one building or in different rooms on the same floor. Furthermore, any two or all of the coarsely crushing apparatus 3, the first sheet manufacturing apparatus 100A, and the second sheet manufacturing apparatus 100B may be installed at different spots in the same room.

The reserving section 12 of the first sheet manufacturing apparatus 100A is referred to as a first reserving section 12A, the remaining amount detector 30 of the first sheet manufacturing apparatus 100A is referred to as a first remaining amount detector 30A, the control section 281 of the first sheet manufacturing apparatus 100A is referred to as a first control section 281A as a first calculation section that calculates the first allowable filling amount, and the communication section 283 of the first sheet manufacturing apparatus 100A is referred to as a first communication section 283A as a first output section.

The reserving section 12 of the second sheet manufacturing apparatus 100B is referred to as a second reserving section 12B, the remaining amount detector 30 of the second sheet manufacturing apparatus 100B is referred to as a second remaining amount detector 30B, the control section 281 of the second sheet manufacturing apparatus 100B is referred to as a second control section 281B as a second calculation section that calculates the second allowable filling amount, and the communication section 283 of the second sheet manufacturing apparatus 100B is referred to as a second communication section 283B as a second output section.

In the first sheet manufacturing apparatus 100A, the first control section 281A calculates the first allowable filling amount of the coarsely crushed pieces M2 in the first reserving section 12A based on a detection result of the first remaining amount detector 30A and the maximum capacity of the first reserving section 12A, and the first communication section 283A outputs the information related to the calculated first allowable filling amount to the server 4.

In the second sheet manufacturing apparatus 100B, the second control section 281B calculates the second allowable filling amount of the coarsely crushed pieces M2 in the second reserving section 12B based on a detection result of the second remaining amount detector 30B and the maximum capacity of the second reserving section 12B, and the second communication section 283B outputs the information related to the calculated second allowable filling amount to the server 4.

The server 4 transmits the received information related to the first allowable filling amount and the second allowable filling amount to the control device 37 of the coarsely crushing apparatus 3 when necessary. The control device 37 acquires the information related to the first allowable filling amount and the second allowable filling amount, generates display information related to the first allowable filling amount and the second allowable filling amount, and displays the information on the display section 36.

The display information related to the first allowable filling amount and the display information related to the second allowable filling amount may be collectively displayed on the display section 36, for example, side by side, may be selectively displayed by the selection of the user, or may be displayed timely, for example, alternately at regular time intervals.

In addition, the display information related to the first allowable filling amount and the second allowable filling amount may be displayed on each display section 29 of the first sheet manufacturing apparatus 100A and the second sheet manufacturing apparatus 100B.

As above, the sheet manufacturing system 1, includes the coarsely crushing apparatus 3 that coarsely crushes the paper M1, the first sheet manufacturing apparatus 100A that generates the sheet-shaped recycled paper S using the coarsely crushed pieces M2 of the paper M1 as the raw material, the second sheet manufacturing apparatus 100B that generates the sheet-shaped recycled paper S using the coarsely crushed pieces M2 of the paper M1 as the raw material, and the server 4 that is coupled to the coarsely crushing apparatus 3, the first sheet manufacturing apparatus 100A, and the second sheet manufacturing apparatus 100B via a network. In addition, the first sheet manufacturing apparatus 100A has the first reserving section 12A that reserves the coarsely crushed pieces M2, the first remaining amount detector 30A that detects the remaining amount of the coarsely crushed pieces M2 in the first reserving section 12A, the first control section 281A as a first calculation section that calculates the first allowable filling amount of the coarsely crushed pieces M2 in the first reserving section 12A based on the detection result of the first remaining amount detector 30A, and the first communication section 283A as a first output section that transmits information related to the calculated first allowable filling amount to the server 4. In addition, the second sheet manufacturing apparatus 100B has the second reserving section 12B that reserves the coarsely crushed pieces M2, the second remaining amount detector 30B that detects the remaining amount of the coarsely crushed pieces in the second reserving section 12B, the second control section 281B as a second calculation section that calculates the second allowable filling amount of the coarsely crushed pieces M2 in the second reserving section 12B based on the detection result of the second remaining amount detector 30B, and the second communication section 283B as a second output section that transmits the information related to the calculated second allowable filling amount to the server 4. Then, the coarsely crushing apparatus 3 has the integration section 33 that integrates the coarsely crushed pieces M2, the communication section 373 that is an input section which acquires the information related to the first allowable filling amount and the second allowable filling amount from the server 4, the control section 371 as the display information generation section that generates the display information related to the first allowable filling amount and the second allowable filling amount based on the information acquired by the communication section 373, and the display section 36 that displays the display information. According to the configuration, when a plurality of sheet manufacturing apparatuses 100 are provided, on the side of the coarsely crushing apparatus 3, it is possible to obtain information related to the side of the first sheet manufacturing apparatus 100A and the side of the second sheet manufacturing apparatus 100B, particularly, information related to the first allowable filling amount and the second allowable filling amount derived from the remaining amount of the coarsely crushed pieces M2 in each of the first reserving section 12A and the second reserving section 12B. As a result, it is possible to easily and appropriately perform the determination of the transport of the coarsely crushed pieces M2 from the coarsely crushing apparatus 3 to the first sheet manufacturing apparatus 100A and perform the determination of the transport of the coarsely crushed pieces M2 from the coarsely crushing apparatus 3 to the second sheet manufacturing apparatus 100B. In particular, it is possible to easily determine which of the first sheet manufacturing apparatus 100A and the second sheet manufacturing apparatus 100B the coarsely crushed pieces M2 should be transported and replenished.

In addition, the control section 371 performs first determination of whether or not the integration amount of the coarsely crushed pieces M2 in the coarsely crushing apparatus 3 exceeds the first allowable filling amount and a second determination of whether or not the integration amount exceeds the second allowable filling amount. Then, these determination results are displayed on the display section 36. That is, the display information generated by the control section 371 includes the results of the first determination and the second determination.

For example, when the total amount of the coarsely crushed pieces M2 in the coarsely crushing apparatus 3 can be inserted into the first sheet manufacturing apparatus 100A, the text "transport to the first sheet manufacturing apparatus 100A is possible" is displayed on the display section 36, although not shown in the drawing.

In addition, when the total amount of the coarsely crushed pieces M2 in the coarsely crushing apparatus 3 can be inserted into the second sheet manufacturing apparatus 100B, the text "transport to the second sheet manufacturing apparatus 100B is possible" is displayed on the display section 36, although not shown in the drawing.

In addition, when the total amount of the coarsely crushed pieces M2 in the coarsely crushing apparatus 3 can be inserted into both the first sheet manufacturing apparatus 100A and the second sheet manufacturing apparatus 100B, the text "transport to the first sheet manufacturing apparatus 100A and the second sheet manufacturing apparatus 100B is possible" is displayed on the display section 36 although not shown in the drawing.

When the total amount of the coarsely crushed pieces M2 in the coarsely crushing apparatus 3 cannot be inserted into both the first sheet manufacturing apparatus 100A and the second sheet manufacturing apparatus 100B, the text "transport to the first sheet manufacturing apparatus 100A and the second sheet manufacturing apparatus 100B is not possible" is displayed on the display section 36, although not shown in the drawing.

The display form on the display section 36 is not limited to the text as described above, and may include symbols, figures, patterns, or something including these.

As above, the coarsely crushing apparatus 3 has the integration amount detector 35 that detects the integration amount of the coarsely crushed pieces M2 in the integration section 33, and the control section 371 as the determination section that performs the first determination of whether or not the integration amount exceeds the first allowable filling amount and the second determination of whether or not the integration amount exceeds the second allowable filling amount based on the integration amount detected by the integration amount detector 35 and the information related to the first allowable filling amount and the information related to the second allowable filling amount, which are acquired from the server 4, in which the generated display information includes the information related to the results of the first determination and the second determination in the control section 371. As a result, when a plurality of sheet manufacturing apparatus 100 are provided, it is possible to easily know whether or not the integration amount of the integration section 33 of the coarsely crushing apparatus 3 exceeds the first allowable filling amount of the first sheet manufacturing apparatus 100A and whether or not the integration amount of the integration section 33 of the coarsely crushing apparatus 3 exceeds the second allowable filling amount of the second sheet manufacturing apparatus 100B. As a result, it is possible to more easily, quickly, and appropriately perform the determination of the transport of the coarsely crushed pieces M2 from the coarsely crushing apparatus 3 to the first sheet manufacturing apparatus 100A and perform the determination of the transport of the coarsely crushed pieces M2 from the coarsely crushing apparatus 3 to the second sheet manufacturing apparatus 100B.

The result of the first determination and the result of the second determination may be collectively displayed on the display section 36, for example, side by side, may be selectively displayed by the selection of the user, or may be displayed timely, for example, alternately at regular time intervals.

In addition, the display information related to the result of the first determination and the result of the second determination may be displayed on the display section 29 of each of the first sheet manufacturing apparatus 100A and the second sheet manufacturing apparatus 100B.

Hereinabove, although the sheet manufacturing system of the present disclosure has been described with respect to each of the embodiments with reference to the drawings, the present disclosure is not limited thereto, and each section that constitutes the sheet manufacturing system can be replaced with an arbitrary configuration that can exhibit similar functions. In addition, arbitrary components may be added to the sheet manufacturing system. In addition, the sheet manufacturing system of the present disclosure may combine the features of each embodiment.

Although the sheet manufacturing system 1 described above has the server 4, the server 4 may not be included as a configuration requirement of the sheet manufacturing system 1.

In addition, in each of the embodiments, the sheet manufacturing apparatus is for manufacturing the sheet by a dry method, but the present disclosure is not limited thereto, and the sheet may be manufactured by a wet method.

In addition, in the second embodiment, the sheet manufacturing system is configured to have two sheet manufacturing apparatuses, but the present disclosure is not limited thereto, and three or more sheet manufacturing apparatuses may be provided. In addition, the sheet manufacturing system of the present disclosure may include a plurality of coarsely crushing apparatuses, for example, a first coarsely crushing apparatus and a second coarsely crushing apparatus.

In addition, the coarsely crushing apparatus may further have a waste paper stock section that stocks waste paper as a raw material upstream the insertion port.

In addition, the sheet manufacturing apparatus may further include a coarsely crushing section. In this case, the coarsely crushing section may be configured to have a coarsely crushing blade upstream the reserving section 12, similar to the coarsely crushing blade 32 in the coarsely crushing apparatus 3 described above.

In addition, at least one of the sheet manufacturing apparatus and the coarsely crushing apparatus may be configured to have a detector that detects a fact that a container similar to the container 50 is loaded into the reserving section or the integration section, and to display a loading/unloading of the container into the display section installed in the coarsely crushing apparatus, the sheet manufacturing apparatus, or the other apparatus.

In addition, the container may be provided with an information carrying section capable of carrying coarsely crushed piece information related to the coarsely crushed pieces, such as the type, paper quality, size, and characteristics of the coarsely crushed pieces. In this case, at least one of the reserving section and the integration section can include a reader that reads the coarsely crushed piece information carried by the information carrying section. The information read by the reader can be used for various managements in the coarsely crushing apparatus and the sheet manufacturing apparatus, and can be displayed on the display section. The information carrying section may rewrite or non-rewrite the coarsely crushed piece information, and examples thereof include a QR code (registered trademark), a barcode, other identifiers, an IC chip, and the like. In addition, information related to the volume or weight of the coarsely crushed pieces which are present in the container described above can be written in the information carrying section as the coarsely crushed piece information.

What is claimed is:

1. A sheet manufacturing system comprising:
   a coarsely crushing apparatus that coarsely crushes a paper;
   a sheet manufacturing apparatus that generates a sheet-shaped recycled paper using coarsely crushed pieces of the paper as a raw material; and
   a server that is connected to the coarsely crushing apparatus and the sheet manufacturing apparatus via a network, wherein
   the sheet manufacturing apparatus has a reserving section that reserves the coarsely crushed pieces, a remaining amount detector that detects a remaining amount of the coarsely crushed pieces in the reserving section, a calculation section that calculates an allowable filling amount of the coarsely crushed pieces in the reserving section based on a detection result of the remaining amount detector, and an output section that transmits information related to the calculated allowable filling amount to the server, and
   the coarsely crushing apparatus has an integration section that integrates the coarsely crushed pieces, an input section that acquires the information related to the allowable filling amount from the server, a display information generation section that generates display information related to the allowable filling amount based on the information acquired by the input section, and a display section that displays the display information.

2. The sheet manufacturing system according to claim 1, wherein
   the display information is information obtained by quantifying the allowable filling amount.

3. The sheet manufacturing system according to claim 1, wherein
   the coarsely crushing apparatus has an integration amount detector that detects an integration amount of the coarsely crushed pieces in the integration section.

4. The sheet manufacturing system according to claim 3, wherein
   the coarsely crushing apparatus has a determination section that determines whether or not the integration amount exceeds the allowable filling amount based on the integration amount detected by the integration amount detector and the information related to the allowable filling amount acquired from the server, and
   the display information generated by the display information generation section includes information related to a determination result in the determination section.

5. The sheet manufacturing system according to claim 1, wherein
   the sheet manufacturing apparatus has at least one piece of specific information of a device ID that specifies the sheet manufacturing apparatus and a user ID that specifies a user who uses the sheet manufacturing apparatus, and the information related to the allowable filling amount, which is transmitted from the output section, is associated with the specific information.

6. A sheet manufacturing system comprising:
a coarsely crushing apparatus that coarsely crushes a paper;
a first sheet manufacturing apparatus that generates a sheet-shaped recycled paper using coarsely crushed pieces of the paper as a raw material;
a second sheet manufacturing apparatus that generates a sheet-shaped recycled paper using coarsely crushed pieces of the paper as a raw material; and
a server that is connected to the coarsely crushing apparatus, the first sheet manufacturing apparatus, and the second sheet manufacturing apparatus via a network, wherein
the first sheet manufacturing apparatus has
    a first reserving section that reserves the coarsely crushed pieces,
    a first remaining amount detector that detects a remaining amount of the coarsely crushed pieces in the first reserving section,
    a first calculation section that calculates a first allowable filling amount of the coarsely crushed pieces in the first reserving section based on a detection result of the first remaining amount detector, and
    a first output section that transmits information related to the calculated first allowable filling amount to the server,
the second sheet manufacturing apparatus has
    a second reserving section that reserves the coarsely crushed pieces,
    a second remaining amount detector that detects a remaining amount of the coarsely crushed pieces in the second reserving section,
    a second calculation section that calculates a second allowable filling amount of the coarsely crushed pieces in the second reserving section based on a detection result of the second remaining amount detector, and
    a second output section that transmits information related to the calculated second allowable filling amount to the server, and
the coarsely crushing apparatus has
    an integration section that integrates the coarsely crushed pieces,
    an input section that acquires information related to the first allowable filling amount and the second allowable filling amount from the server,
    a display information generation section that generates display information related to the first allowable filling amount and the second allowable filling amount based on the information acquired by the input section, and
    a display section that displays the display information.

7. The sheet manufacturing system according to claim 6, wherein
the coarsely crushing apparatus has
    an integration amount detector that detects an integration amount of the coarsely crushed pieces in the integration section, and
    a determination section that performs first determination of whether or not the integration amount exceeds the first allowable filling amount and second determination of whether or not the integration amount exceeds the second allowable filling amount based on the integration amount detected by the integration amount detector, and the information related to the first allowable filling amount and the information related to the second allowable filling amount which are acquired from the server, and
the display information generated by the display information generation section includes information related to results of the first determination and the second determination by the determination section.

* * * * *